United States Patent
Zhai et al.

(10) Patent No.: US 9,798,718 B2
(45) Date of Patent: *Oct. 24, 2017

(54) INCREMENTAL MULTI-WORD RECOGNITION

(71) Applicant: Google Inc., Mountain View, CA (US)

(72) Inventors: Shumin Zhai, Los Altos, CA (US); Yu Ouyang, San Jose, CA (US); Ken Wakasa, Tokyo (JP); Satoshi Kataoka, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,876

(22) Filed: Sep. 14, 2016

(65) Prior Publication Data
US 2017/0003869 A1    Jan. 5, 2017

Related U.S. Application Data

(63) Continuation of application No. 14/851,759, filed on Sep. 11, 2015, now Pat. No. 9,542,385, which is a (Continued)

(51) Int. Cl.
G06F 13/00 (2006.01)
G06F 15/00 (2006.01)
(Continued)

(52) U.S. Cl.
CPC ............ G06F 17/277 (2013.01); G06F 3/017 (2013.01); G06F 3/0237 (2013.01);
(Continued)

(58) Field of Classification Search
CPC ............................ G06F 3/04886; G06F 3/0414
(Continued)

(56) References Cited

U.S. PATENT DOCUMENTS 4,534,261 A    8/1985 Fabrizio
4,833,610 A    5/1989 Zamora et al.
(Continued)

FOREIGN PATENT DOCUMENTS

CN    1133996 A    10/1996
CN    1761989 A    4/2006
(Continued)

OTHER PUBLICATIONS

"7 Swype keyboard tips for better Swyping," by Ed Rhee, found at http://howto.cnel. com/8301-1131 0_39-20070627-285/7-swype-keyboard-lips-for-belter-swyping/, posted Jun. 14, 2011, 5 pp.
(Continued)

*Primary Examiner* — Kevin Nguyen
(74) *Attorney, Agent, or Firm* — Shumaker & Sieffert, P.A.

(57) ABSTRACT

In one example, a computing device includes at least one processor that is operatively coupled to a presence-sensitive display and a gesture module operable by the at least one processor. The gesture module may be operable by the at least one processor to output, for display at the presence-sensitive display, a graphical keyboard comprising a plurality of keys and receive an indication of a continuous gesture detected at the presence-sensitive display, the continuous gesture to select a group of keys of the plurality of keys. The gesture module may be further operable to determine, in response to receiving the indication of the continuous gesture and based at least in part on the group of keys of the plurality of keys, a candidate phrase comprising a group of candidate words.

20 Claims, 7 Drawing Sheets

Related U.S. Application Data continuation of application No. 14/196,552, filed on Mar. 4, 2014, now Pat. No. 9,134,906, which is a continuation of application No. 13/787,513, filed on Mar. 6, 2013, now Pat. No. 8,701,032.

(60) Provisional application No. 61/714,696, filed on Oct. 16, 2012.

(51) Int. Cl.

| | | |
|---|---|---|
| *G06F 17/27* | (2006.01) | |
| *G06F 3/01* | (2006.01) | |
| *G06F 3/023* | (2006.01) | |
| *G06F 3/0488* | (2013.01) | |
| *G06F 3/041* | (2006.01) | |

(52) U.S. Cl.
CPC ...... *G06F 3/04883* (2013.01); *G06F 3/04886* (2013.01); *G06F 17/276* (2013.01); *G06F 3/0414* (2013.01)

(58) Field of Classification Search
USPC .............................. 715/773, 780, 763–765
See application file for complete search history.

(56) References Cited

U.S. PATENT DOCUMENTS

| | | |
|---|---|---|
| 4,847,766 A | 7/1989 | McRae et al. |
| 4,988,981 A | 1/1991 | Zimmerman et al. |
| 5,075,896 A | 12/1991 | Wilcox et al. |
| 5,115,482 A | 5/1992 | Stallard et al. |
| 5,202,803 A | 4/1993 | Albrecht et al. |
| 5,307,267 A | 4/1994 | Yang |
| 5,319,747 A | 6/1994 | Gerrissen et al. |
| 5,440,070 A | 8/1995 | Okamoto et al. |
| 5,502,803 A | 3/1996 | Yoshida et al. |
| 5,521,986 A | 5/1996 | Curtin, II et al. |
| 5,593,541 A | 1/1997 | Wong et al. |
| 5,606,494 A | 2/1997 | Oshima et al. |
| 5,677,710 A | 10/1997 | Thompson-Rohrlich |
| 5,684,873 A | 11/1997 | Tiilikainen |
| 5,717,939 A | 2/1998 | Bricklin et al. |
| 5,748,512 A | 5/1998 | Vargas |
| 5,761,689 A | 6/1998 | Rayson et al. |
| 5,765,180 A | 6/1998 | Travis |
| 5,781,179 A | 7/1998 | Nakajima et al. |
| 5,784,504 A | 7/1998 | Anderson et al. |
| 5,805,167 A | 9/1998 | van Cruyningen |
| 5,845,306 A | 12/1998 | Schabes et al. |
| 5,848,187 A | 12/1998 | Bricklin et al. |
| 5,903,229 A | 5/1999 | Kishi |
| 5,905,246 A | 5/1999 | Fajkowski |
| 5,917,493 A | 6/1999 | Tan et al. |
| 5,953,541 A | 9/1999 | King et al. |
| 6,008,799 A | 12/1999 | Van Kleeck |
| 6,032,053 A | 2/2000 | Schroeder et al. |
| 6,041,292 A | 3/2000 | Jochim |
| 6,047,300 A | 4/2000 | Walfish |
| 6,057,845 A | 5/2000 | Dupouy |
| 6,061,050 A | 5/2000 | Allport et al. |
| 6,072,473 A | 6/2000 | Muller et al. |
| 6,094,188 A | 7/2000 | Horton et al. |
| 6,115,482 A | 9/2000 | Sears et al. |
| 6,131,102 A | 10/2000 | Potter |
| 6,150,600 A | 11/2000 | Buchla |
| 6,160,555 A | 12/2000 | Kang et al. |
| 6,278,453 B1 | 8/2001 | Bodnar |
| 6,286,064 B1 | 9/2001 | King et al. |
| 6,292,179 B1 | 9/2001 | Lee |
| 6,310,634 B1 | 10/2001 | Bodnar et al. |
| 6,340,979 B1 | 1/2002 | Beaton et al. |
| RE37,654 E | 4/2002 | Longo |
| 6,396,523 B1 | 5/2002 | Segal et al. |
| 6,407,679 B1 | 6/2002 | Evans et al. |
| 6,417,874 B2 | 7/2002 | Bodnar |
| 6,424,983 B1 | 7/2002 | Schabes et al. |
| 6,438,523 B1 | 8/2002 | Oberteuffer et al. |
| 6,512,838 B1 | 1/2003 | Rafii et al. |
| 6,542,170 B1 | 4/2003 | Williams et al. |
| 6,570,557 B1 | 5/2003 | Westerman et al. |
| 6,573,844 B1 | 6/2003 | Venolia et al. |
| 6,630,924 B1 | 10/2003 | Peck |
| 6,674,895 B2 | 1/2004 | Rafii et al. |
| 6,686,931 B1 | 2/2004 | Bodnar |
| 6,789,231 B1 | 9/2004 | Reynar et al. |
| 6,801,190 B1 | 10/2004 | Robinson et al. |
| 6,983,247 B2 | 1/2006 | Ringger et al. |
| 7,028,259 B1 | 4/2006 | Jacobson |
| 7,030,863 B2 | 4/2006 | Long et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,170,430 B2 | 1/2007 | Goodgoll |
| 7,199,786 B2 | 4/2007 | Suraqui |
| 7,207,004 B1 | 4/2007 | Harrity |
| 7,231,343 B1 | 6/2007 | Treadgold et al. |
| 7,250,938 B2 | 7/2007 | Kirkland et al. |
| 7,251,367 B2 | 7/2007 | Zhai |
| 7,269,019 B2 | 9/2007 | Hirata et al. |
| 7,277,088 B2 | 10/2007 | Robinson et al. |
| 7,296,019 B1 | 11/2007 | Chadrasekar et al. |
| 7,336,827 B2 | 2/2008 | Geiger et al. |
| 7,366,983 B2 | 4/2008 | Brill et al. |
| 7,382,358 B2 | 6/2008 | Kushler et al. |
| 7,453,439 B1 | 11/2008 | Kushler et al. |
| 7,479,949 B2 | 1/2009 | Jobs et al. |
| 7,487,461 B2 | 2/2009 | Zhai et al. |
| 7,508,324 B2 | 3/2009 | Suraqui |
| 7,542,029 B2 | 6/2009 | Kushler |
| 7,706,616 B2 | 4/2010 | Kristensson |
| 7,716,579 B2 | 5/2010 | Gunn et al. |
| 7,730,402 B2 | 6/2010 | Song |
| 7,750,891 B2 | 7/2010 | Stephanick et al. |
| 7,809,719 B2 | 10/2010 | Furuuchi et al. |
| 7,831,423 B2 | 11/2010 | Schubert |
| 7,880,730 B2 | 2/2011 | Robinson et al. |
| 7,886,233 B2 | 2/2011 | Rainisto et al. |
| 7,895,518 B2 | 2/2011 | Kristensson |
| 7,907,125 B2 | 3/2011 | Weiss et al. |
| 7,920,132 B2 | 4/2011 | Longe et al. |
| 7,921,361 B2 | 4/2011 | Gunn et al. |
| 7,973,770 B2 | 7/2011 | Tokkonen |
| 8,036,878 B2 | 10/2011 | Assadollahi |
| 8,059,101 B2 | 11/2011 | Westerman et al. |
| 8,135,582 B2 | 3/2012 | Suraqui |
| 8,232,972 B2 | 7/2012 | Huang et al. |
| 8,232,973 B2 | 7/2012 | Kocienda et al. |
| 8,266,528 B1 | 9/2012 | Hayes |
| 8,280,886 B2 | 10/2012 | Labrou et al. |
| 8,359,543 B2 | 1/2013 | Sengupta |
| 8,438,160 B2 | 5/2013 | Aravamudan et al. |
| 8,504,349 B2 | 8/2013 | Manu et al. |
| 8,514,178 B2 | 8/2013 | Song et al. |
| 8,542,206 B2 | 9/2013 | Westerman et al. |
| 8,552,984 B2 | 10/2013 | Knaven |
| 8,587,542 B2 | 11/2013 | Moore |
| 8,619,048 B2 | 12/2013 | Shimoni |
| 8,667,414 B2 | 3/2014 | Zhai et al. |
| 8,701,032 B1 | 4/2014 | Zhai et al. |
| 8,782,549 B2 | 7/2014 | Ouyang et al. |
| 8,819,574 B2 | 8/2014 | Ouyang et al. |
| 8,843,845 B2 | 9/2014 | Ouyang et al. |
| 8,850,350 B2 | 9/2014 | Bi et al. |
| 9,021,380 B2 | 4/2015 | Zhai et al. |
| 9,134,906 B2 | 9/2015 | Zhai et al. |
| 2002/0013794 A1 | 1/2002 | Carro et al. |
| 2002/0015064 A1 | 2/2002 | Robotham et al. |
| 2002/0129012 A1 | 9/2002 | Green |
| 2002/0143543 A1 | 10/2002 | Sirivara |
| 2002/0194223 A1 | 12/2002 | Meyers et al. |

(56) References Cited

U.S. PATENT DOCUMENTS

| | | |
|---|---|---|
| 2003/0006967 A1 | 1/2003 | Pihlaja |
| 2003/0095053 A1 | 5/2003 | Kandogan et al. |
| 2003/0095104 A1 | 5/2003 | Kandogan et al. |
| 2003/0097252 A1 | 5/2003 | Mackie |
| 2003/0165801 A1 | 9/2003 | Levy |
| 2004/0120583 A1 | 6/2004 | Zhai |
| 2004/0140956 A1 | 7/2004 | Kushler et al. |
| 2005/0052406 A1 | 3/2005 | Stephanick et al. |
| 2005/0114115 A1 | 5/2005 | Karidis et al. |
| 2005/0146508 A1 | 7/2005 | Kirkland et al. |
| 2005/0171783 A1 | 8/2005 | Suominen |
| 2005/0190973 A1 | 9/2005 | Kristensson et al. |
| 2006/0004638 A1 | 1/2006 | Royal et al. |
| 2006/0026536 A1 | 2/2006 | Hotellings et al. |
| 2006/0028450 A1 | 2/2006 | Suraqui |
| 2006/0050962 A1 | 3/2006 | Geiger et al. |
| 2006/0053387 A1 | 3/2006 | Ording |
| 2006/0055669 A1 | 3/2006 | Das |
| 2006/0119582 A1 | 6/2006 | Ng et al. |
| 2006/0173674 A1 | 8/2006 | Nakajima et al. |
| 2006/0176283 A1 | 8/2006 | Suraqui |
| 2006/0253793 A1 | 11/2006 | Zhai et al. |
| 2006/0256139 A1 | 11/2006 | Gikandi |
| 2006/0265648 A1 | 11/2006 | Rainisto et al. |
| 2007/0016862 A1 | 1/2007 | Kuzmin |
| 2007/0040813 A1 | 2/2007 | Kushler et al. |
| 2007/0083276 A1 | 4/2007 | Song |
| 2007/0089070 A1 | 4/2007 | Jaczyk |
| 2007/0094024 A1 | 4/2007 | Kristensson et al. |
| 2007/0152980 A1 | 7/2007 | Kocienda et al. |
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0167858 A1 | 7/2008 | Christie et al. |
| 2008/0172293 A1 | 7/2008 | Raskin et al. |
| 2008/0229255 A1 | 9/2008 | Linjama et al. |
| 2008/0232885 A1 | 9/2008 | Mock et al. |
| 2008/0240551 A1 | 10/2008 | Zitnick et al. |
| 2008/0270896 A1 | 10/2008 | Kristensson |
| 2008/0316183 A1 | 12/2008 | Westerman et al. |
| 2009/0058823 A1 | 3/2009 | Kocienda |
| 2009/0077464 A1 | 3/2009 | Goldsmith et al. |
| 2009/0100338 A1 | 4/2009 | Saetti |
| 2009/0100383 A1 | 4/2009 | Sunday et al. |
| 2009/0119376 A1 | 5/2009 | Bomma |
| 2009/0189864 A1 | 7/2009 | Walker et al. |
| 2009/0249198 A1 | 10/2009 | Davis et al. |
| 2010/0021871 A1 | 1/2010 | Layng et al. |
| 2010/0029910 A1 | 2/2010 | Shiba et al. |
| 2010/0070908 A1 | 3/2010 | Mori et al. |
| 2010/0079382 A1 | 4/2010 | Suggs |
| 2010/1179382 | 4/2010 | Suggs |
| 2010/0125594 A1 | 5/2010 | Li et al. |
| 2010/0131447 A1 | 5/2010 | Creutz et al. |
| 2010/0141484 A1 | 6/2010 | Griffin |
| 2010/0179382 A1 | 7/2010 | Shelton, IV et al. |
| 2010/0199226 A1 | 8/2010 | Nurmi |
| 2010/0235780 A1 | 9/2010 | Westerman et al. |
| 2010/0238125 A1 | 9/2010 | Ronkainen et al. |
| 2010/0257478 A1 | 10/2010 | Longe et al. |
| 2010/0259493 A1 | 10/2010 | Chang et al. |
| 2010/0271299 A1 | 10/2010 | Stephanick et al. |
| 2010/0315266 A1 | 12/2010 | Gunawardana et al. |
| 2011/0010174 A1 | 1/2011 | Longe et al. |
| 2011/0061017 A1 | 3/2011 | Ullrich et al. |
| 2011/0063224 A1 | 3/2011 | Vexo et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidlovskii et al. |
| 2011/0107206 A1 | 5/2011 | Walsh et al. |
| 2011/0119617 A1 | 5/2011 | Kristensson et al. |
| 2011/0122081 A1 | 5/2011 | Kushler |
| 2011/0141027 A1 | 6/2011 | Ghassabian |
| 2011/0141031 A1 | 6/2011 | McCullough et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0193797 A1 | 8/2011 | Unruh |
| 2011/0202834 A1 | 8/2011 | Mandryk et al. |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0209088 A1 | 8/2011 | Hinckley et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2011/0291940 A1 | 12/2011 | Ghassabian |
| 2012/0011462 A1 | 1/2012 | Westerman et al. |
| 2012/0029910 A1 | 2/2012 | Medlock et al. |
| 2012/0036468 A1 | 2/2012 | Colley |
| 2012/0036469 A1* | 2/2012 | Suraqui ............... G06F 3/04883 715/773 |
| 2012/0036485 A1 | 2/2012 | Watkins, Jr. et al. |
| 2012/0046544 A1 | 2/2012 | Inoue |
| 2012/0075190 A1 | 3/2012 | Sengupta |
| 2012/0079412 A1 | 3/2012 | Kocienda et al. |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1* | 5/2012 | Yang ................. G06F 17/3064 707/767 |
| 2012/0131514 A1 | 5/2012 | Ansell et al. |
| 2012/0162092 A1 | 6/2012 | Pasquero et al. |
| 2012/0166428 A1 | 6/2012 | Kakade et al. |
| 2012/0223889 A1 | 9/2012 | Medlock et al. |
| 2012/0242579 A1 | 9/2012 | Chua |
| 2012/0259615 A1 | 10/2012 | Morin et al. |
| 2012/0274745 A1 | 11/2012 | Russell |
| 2012/0290946 A1 | 11/2012 | Schrock et al. |
| 2012/0310626 A1 | 12/2012 | Kida et al. |
| 2013/0046544 A1 | 2/2013 | Kay et al. |
| 2013/0074014 A1 | 3/2013 | Ouyang et al. |
| 2013/0082824 A1 | 4/2013 | Colley |
| 2013/0120266 A1 | 5/2013 | Griffin et al. |
| 2013/0120430 A1 | 5/2013 | Li et al. |
| 2013/0125034 A1 | 5/2013 | Griffin et al. |
| 2013/0135209 A1 | 5/2013 | Zhai et al. |
| 2013/0176228 A1 | 7/2013 | Griffin et al. |
| 2013/0205242 A1 | 8/2013 | Colby |
| 2013/0212515 A1 | 8/2013 | Eleftheriou |
| 2013/0332822 A1 | 12/2013 | Willmore et al. |
| 2014/0098023 A1 | 4/2014 | Zhai et al. |
| 2014/0201671 A1 | 7/2014 | Zhai et al. |
| 2014/0344748 A1 | 11/2014 | Ouyang et al. |
| 2015/0012873 A1 | 1/2015 | Bi et al. |
| 2015/0026628 A1 | 1/2015 | Ouyang et al. |

FOREIGN PATENT DOCUMENTS

| | | |
|---|---|---|
| CN | 100472600 C | 3/2009 |
| CN | 101390039 A | 3/2009 |
| CN | 101393506 A | 3/2009 |
| CN | 101689189 A | 3/2010 |
| CN | 10178855 A | 7/2010 |
| CN | 102411477 A | 4/2012 |
| CN | 102508553 A | 6/2012 |
| CN | 102541304 A | 7/2012 |
| CN | 102576255 A | 7/2012 |
| CN | 102629158 A | 8/2012 |
| CN | 102693090 A | 9/2012 |
| EP | 0844570 A2 | 5/1998 |
| EP | 1603014 A1 | 7/2005 |
| EP | 1860576 A1 | 11/2007 |
| EP | 1887451 A3 | 6/2009 |
| EP | 2369446 A2 | 9/2011 |
| TW | 201040793 A1 | 11/2010 |
| WO | 2004/066075 A2 | 8/2004 |
| WO | 2005064587 A2 | 7/2005 |

(56) References Cited

FOREIGN PATENT DOCUMENTS

| WO | 2007/017660 A2 | 2/2007 |
|---|---|---|
| WO | 2007035827 A2 | 3/2007 |
| WO | 2008/013658 A1 | 1/2008 |
| WO | 2011/113057 A1 | 9/2011 |
| WO | 2013/107998 A1 | 7/2013 |

OTHER PUBLICATIONS

"Advanced tips for Swype," found at www.swype.com/tips/advanced-tips/, downloaded Aug. 20, 2012, 3 pp.
"How to Type Faster with the Swype Keyboard for Android-How-To Geek," found at www.howtogeek.com/106643/ how-to-type-faster-with-the-swype-keyboard-for-android/, downloaded Jun. 4, 2012, 13 pp.
"Keymonk Keyboard Free-Android Apps on Google Play, Description," found at https://play.google.com/store/apps/details?id=com.keymonk.latin&hl=en, downloaded Oct. 3, 2012, 2 pp.
"Keymonk Keyboard Free-Android Apps on Google Play, Permissions," found at https://play.google.com/store/apps/details?id=com.keymonk.latin&hl=en, downloaded Oct. 3, 2012, 2 pp.
"Keymonk Keyboard Free-Android Apps on Google Play. User Reviews," found at https://play.google.com/store/apps/details?id=com.keymonk.latin&hl=en, downloaded Oct. 3, 2012, 2 pp.
"Keymonk—The Future of Smartphone Keyboards," found at www.keymonk.com, downloaded Sep. 5, 2012, 2 pp.
"Nuance Supercharges Swype, Adds New Keyboard Options, XT9 Predictive Text, and Dragon-Powered Voice Input," found at http://techcrunch.com/2012/06/20/nuance-supercharges-swype-adds-new-keyboard-options-xt9-predictive-text-and-dragon-powered-voice-input/, downloaded Jun. 4, 2012, 2 pp.
"Sensory Software-Text Chat, found at www.sensorysoftware.com/textchat.html," downloaded Jun. 4, 2012, 3 pp.
"ShapeWriter Keyboard allows you to input on Android the same experience with on PC, Android forums," found at talkandroid.com/ . . . /2767-shapewriter-keyboard-allows-you-input-android-same-experience-pc.html, last updated Oct. 25, 2009, 3 pp.
"ShapeWriter Research Project home page," accessed May 25, 2012, found at http://www.almaden.ibm.com/u/zhai/shapewriter_research.html, 12 pp.
"ShapeWriter vs Swype Keyboard, DroidForums.net," found at www.droidforums.net/forum/droid-applications/48707-shapewriter-vs-swype-keyboard.html, last updated Jun. 1, 2010, 5 pp.
"SlideiT Soft Keyboard", SlideiT [online]. First accessed on Jan. 31, 2012. retrieved from the Internet: https://play.google.com/store/apps/details?id=com .dasur.slideit.vtlite&hl=en, 4 pp.
"Split Keyboard for iPad [Concept]," by Skipper Eye, Apr. 23, 2010, found at http://www.redmondpie.com/splil- keyboard-for-ipad-9140675/, 6 pp.
"Split Keyboard for Thumb Typing Coming to iPad with iOS 5," by Kevin Purcell, Jun. 6, 2011, found at http://www.gottabemobile.com/2011/06/06/split-keyboard-for-thumb-typing-coming-to-ipad-with-ios-5/, 8 pp.
"SwiftKey counters Swipe with a Smarter Version Makes an In-Road Into Healthcare Market," found at http://techcrunch.com/2012/06/21/swiftkey-counters-swype-with-a-smarter-version-makes-an-in-road-into-healthcare-market/, Jun. 21, 2012, 2 pp.
"SwiftKey Keyboard—Android Apps on Google Play," found at https://play.google.com/store/apps/details?id=com. touchtype.swiftkey&hl=en, accessed on Jun. 8, 2012, 3 pp.
"SwiftKey 3 Keyboard-Android Apps on Google Play," found at web.archive.org/web/20121127141326/https://play.google.com/store/apps/details?id=com.touchtype.swiftkey&hl=en, accessed on Nov. 27, 2012, 4 pp.
"Swipe Nuance Home, Type Fast, Swipe Faster," found at http://www.swipe.com/, accessed on May 25, 2012, 1 p.
"Swype-Swype Basics," found at www.swype.com/tips/swype-basics/, downloaded Jun. 8, 2012, 2 pp.

Text input for future computing devices (SHARK shorthand and ATOMIK). SHARK Shorthand Home Page, retrieved from http://www.almaden.ibm.com/u/zhai/topics/virtualkeyboard.html, accessed on Sep. 20, 2012, 4 pp.
"Welcome to CooTek-TouchPal, an innovative soft keyboard," Touch Pal v1.0 for Android will Release Soon!, found at www.cootek.com/intro-android.aspx, downloaded Aug. 20, 2012, 2 pp.
"Why your typing sucks on Android, and how to fix it," by Martin Bryant, Mar. 3, 2010, found at thenextweb.com/mobile/2010/03/03/typing-sucks-android-fix/, 3 pp.
Accot et al., "Refining Fitts' Law Models for Bivariate Pointing," IBM Almaden Research Center, Paper: Pointing and Manipulating, Apr. 5-10, 2003, pp. 193-200.
Alkanhal, et al., "Automatic Stochastic Arabic Spelling Correction with Emphasis on Space Insertions and Deletions," IEEE Transactions on Audio, Speech, and Language Processing, vol. 20(7), Sep. 2012, 12 pp.
"Avoid iPhone navigation and typing hassles," by Ted Landau, Dec. 28, 2007, found at www.macworld.com/ article/1131264/tco_iphone.html, 9 pp.
Bellegarda, "Statistical Language Model Adaptation: Review and Perspectives", Speech Communication 42, Jan. 2004, pp. 93-108.
CiteSeer, "Token Passing: a Simple Conceptual Model for Connected Speech Recognition Systems" (1989), by S.J. Young et al., found at (http://citeseerx.ist.psu.edu/viewdoc/summary?doi=10.1.1.17.7829), accessed on Apr. 30, 2012, 2 pp.
Dasur Pattern Recognition Ltd. SlideiT Keyboard—User Guide, Jul. 2011, found at http://www.mobiletextinput.com/App_Open/Manual/SlideIT_UserGuide[English]v4.0.pdf, 21 pp.
Goodman et al., "Language Modeling for Soft Keyboards," Microsoft Research, Nov. 28, 2001, 9 pp.
Goodman et al., Language Modeling for Soft Keyboards, Proceedings of the 7th International Conference on Intelligent user interfaces, Jan. 13-16, 2002, pp. 194-195.
Goodman, "A Bit of Progress in Language Modeling Extended Version," Machine Learning and Applied Statistics Group, Microsoft Corporation, Aug. 2001, 73 pp.
Goodman, "A bit of progress in Language Modeling," Computer Speech & Language, Oct. 2001, pp. 403-434.
Gunawardana et al., "Usability Guided Key-Target Resizing for Soft Keyboards," Proceedings of the 15th International Conference on Intelligent user interfaces, Feb. 7-10, 2010, pp. 111-118.
Harb et al., "Back-off Language Model Compression," Google Inc., 2009, 4 pp.
Kane et al., "TrueKeys: Identifying and Correcting Typing Errors for People with Motor Impairments," Proceedings of the 13th International Conference on Intelligent User Interfaces, IUI '08, Jan. 13, 2008, 4 pp.
Karch, "Typing, Copy, and Search," Android Tablets Made Simple, Nov. 18, 2011, 13 pp.
Keymonk Keyboard Free-Android Apps on Google Play, What's New, found at https://play.google.com/store/apps/ details?id=com.keymonk.latin&hl=en, downloaded Oct. 3, 2012, 2 pp.
Kristensson et al., "Command Strokes with and without Preview: Using Pen Gestures on Keyboard for Command Selection," CHI Proceedings, San Jose, CA, USA, Apr. 28-May 3, 2007, 10 pp.
Kristensson et al., "Relaxing Stylus Typing Precision by Geometric Pattern Matching," Proceedings of the 1oth International Conference on Intelligent User Interfaces, Jan. 9-12, 2005, pp. 151-158.
Kristensson et al., "SHARK2: A Large Vocabulary Shorthand Writing System for Pen-based Computers", UIST 2004, Proceedings of the 17th Annual ACM Symposium on User Interface Software and Technology, pp. 43-52.
Landau, "Android OS—Language & keyboard settings," found at support.google.com/ics/nexus/bin/answer.py? hl=en&answer=168584, downloaded Jun. 4, 2012, 3 pp.
Li, "Protractor: A Fast and Accurate Gesture Recognizer" CHI2010, Apr. 10-15, 2010, Atlanta, Georgia, pp. 2169-2172.
Lomas, "Hey Apple, What the Next iPhone Really, Really Needs Is a Much Better Keyboard," http://techcrunch.com/2013/04/21/the-iphone-keyboard-stinks/?, Apr. 21, 2013, 6 pp.

(56) References Cited

OTHER PUBLICATIONS

MacKenzie et al., "LetterWise: Prefix-based Disambiguation for Mobile Text Input," Proceedings of the 14th Annual ACM Symposium on User Interface Software and Technology, Nov. 11-14, 2001, pp. 111-120.
Marziah, "Typing, copying and Search," Android Tables Made Simple, Nov. 18, 2011, 7 pp.
Mohri et al., "Speech Recognition With Weighted Finite-State Transducers," Springer Handbook on Speech Processing and Speech Communication, 2008, 31 pp.
Naseem, "A Hybrid Approach for Urdu Spell Checking", National University of Computer & Emerging Sciences, Nov. 2004, 87 pp.
Rybach et al., "Silence is Golden: Modeling Non-speech Events in WFST-Based Dynamic Network Decoders," Human Language Technology and Pattern Recognition, Computer Science Department RWTH Aachen University, Mar. 2012, 4pp.
SlideiT Soft Keyboard, SlideiT [online], First accessed on Jan. 31, 2012, retrieved from the Internet: https://play.google.com/store/apps/details?id=com .dasur.slideit.vt.lite&hl=en, 4 pp.
Suraqui, U.S. Appl. No. 60/505,724, filed Sep. 22, 2003, 47 pp.
Suraqui, U.S. Appl. No. 60/430,338, filed Nov. 29, 2002, 31 pgs.
Tappert et al., "The State of the Art in On-Line Handwriting Recognition," IEEE Transactions on Pattern Analysis and Machine Intelligence, vol. 12, No. 8, Aug. 1990, pp. 787-808.
Williamson et al., "Hex: Dynamics and Probabilistic Text Entry," Switching and Learning LNCS 3355, 2005, pp. 333-342.
Wobbrock et al., "$1 Unistroke Recognizer in JavaScript," [online], first accessed on Jan. 24, 2012, retrieved from the Internet: http://depts.washington.edu/aimgroup/proj/dollar/, 2 pp.
Wobbrock et al., "Gestures without Libraries, Toolkits or Training. A $1 Recognizer for User Inter face Prototypes," UIST 2007, Proceedings of the 2oth Annual ACM Symposium on User Interface Software and Technology, Aug. 19, 2007, pp. 159-168.
Young et al., "Token Passing: a Simple Conceptual Model for Connected Speech Recognition Systems," Cambridge University Engineering Department, Jul. 31, 1989, 23 pp.
Youtube, "Automatic error correction on graphical keyboard," retrieved from http://www.youtube.com/watch? v=_VgYrz7Pi60, uploaded on Jun. 14, 2007, 1 p.
Youtube, "BlindType—Demo 1 ,"retrieved from http://www.youtube.com/watch?v=M968NIMd79w, uploaded on Jul. 17, 2010, 1 p.
Youtube, "BlindType—Demo 2," retrieved from http://www.youtube.com/watch?v=7gDF4ocLhQM, uploaded on Aug. 2, 2010, 1 p.
Youtube, "BlindType on Android," retrieved from http://www.youtube.com/watch?v=m6eKm1gUnTE, uploaded on Aug. 7, 2010, 1 p.
Youtube, "BlindType—Thank you!," retrieved from http://www.youtube.com/watch?v=KTw4JexFW-o, uploaded on Jul. 22, 2010, 1 p.
Zhai et al., "In search of effective text input interfaces for off the desktop computing," Interacting with Computers 17, Feb. 20, 2004, pp. 229-250.
Zhai,"Text input for future computing devices (SHARK shorthand and ATOMIK)," SHARK Shorthand [online]. Apr. 23, 2012. First Accessed on Jan. 31, 2014. retrieved from the Internet: https://web.archive.org/web/20120423013658/http://www.almaden.ibm.com/u/zhai/topics/virtualkeyboard.html, 3 pp.
Prosecution History from U.S. Appl. No. 14/851,759 dated Sep. 28, 2015 through Dec. 21, 2016, 42 pp.
International Preliminary Report on Patentability from International Application No. PCT/US2013/064890 dated Apr. 30, 2015, 10 pp.
Prosecution History from U.S. Appl. No. 13/787,513 dated Jun. 20, 2013 through Mar. 11, 2014, 33 pp.
Prosecution History from U.S. Appl. No. 14/196,552 dated Mar. 14, 2014 through Jun. 18, 2015, 81 pp.
Prosecution History from U.S. Appl. No. 13/657,574 dated Feb. 7, 2013 through Apr. 14, 2014, 53 pp.
Prosecution History from U.S. Appl. No. 14/452,035 dated Oct. 6, 2014, 82 pp.
First Office Action, and translation thereof, from counterpart Chinese Patent Application No. 2013800504132.6, dated Nov. 20, 2015, 18 pp.
Second Office Action, and translation thereof, from counterpart Chinese Application No. 201380054132.6, dated Jun. 27, 2016, 13 pp.

\* cited by examiner

INCREMENTAL MULTI-WORD RECOGNITION

RELATED APPLICATION

This application is a continuation of U.S. application Ser. No. 14/851,759, filed Sep. 11, 2015, which is a continuation of U.S. application Ser. No. 14/196,552, filed Mar. 4, 2014, which is a continuation of U.S. application Ser. No. 13/787,513, filed Mar. 6, 2013, which are hereby expressly incorporated by reference herein. U.S. application Ser. No. 13/787,513 also claims the benefit of U.S. Provisional Application No. 61/714,696, filed Oct. 16, 2012, which is also hereby expressly incorporated by reference herein.

BACKGROUND

Some computing devices (e.g., mobile phones, tablet computers, etc.) may provide a graphical keyboard as part of a graphical user interface for composing text using a presence-sensitive display (e.g., screen). The graphical keyboard may enable a user of the computing device to enter text (e.g., an e-mail, a text message, or a document, etc.). For instance, a presence-sensitive display of a computing device may present a graphical (or "soft") keyboard that enables the user to enter data by indicating (e.g., by tapping) keys displayed at the presence-sensitive display.

Gesture-based keyboards may be used to input text into a smartphone. Such keyboards may suffer from limitations in accuracy, speed, and inability to adapt to the user. In some examples, a gesture-based keyboard may include functionality to provide word predictions and/or autocorrections of character strings entered by a user. As a user becomes accustomed to a gesture-based keyboard, the user may wish to enter character strings with many characters in a single gesture. In some examples, prediction and/or autocorrection accuracy may diminish as the number of characters included in a single gesture increases.

SUMMARY

In one example, a method includes outputting, by a computing device and for display at a presence-sensitive display operatively coupled to the computing device, a graphical keyboard comprising a plurality of keys, and receiving, by the computing device, an indication of a gesture detected at the presence-sensitive display, a first portion of the gesture to select a first key of the plurality of keys and a second portion of the gesture to select a second key of the plurality of keys. The method further includes determining, by the computing device and based at least in part on the first key, a word-level token comprising a single string of a plurality of predicted characters, and determining, by the computing device, that the word-level token represents a candidate word included in a lexicon. The method further includes determining, by the computing device and in response to determining that the word-level token represents the candidate word in the lexicon, a phrase-level token based at least in part on the word-level token and the second character key, wherein the phrase-level token comprises a plurality of character strings.

In another example, a computer-readable storage medium is encoded with instructions that, when executed, cause at least one processor of a computing device to output, for display at a presence-sensitive display operatively coupled to the computing device, a graphical keyboard comprising a plurality of keys, and receive an indication of a continuous gesture detected at the presence-sensitive display, the continuous gesture to select a group of keys of the plurality of keys. The computer-readable storage medium is further encoded with instructions that, when executed, cause the at least one processor to determine, in response to receiving the indication of the continuous gesture to select the group of keys, a phrase-level token representing a plurality of candidate words, wherein the phrase-level token comprises a plurality of character strings.

In another example, a device includes at least one processor that is operatively coupled to a presence-sensitive display, and a gesture module operable by the at least one processor to output, for display at the presence-sensitive display, a graphical keyboard comprising a plurality of keys, and receive an indication of a continuous gesture detected at the presence-sensitive display, the continuous gesture to select a group of keys of the plurality of keys. The gesture module is further operable by the at least one processor to determine, in response to receiving the indication of the continuous gesture and based at least in part on the group of keys of the plurality of keys, a candidate phrase comprising a group of candidate words.

The details of one or more examples of the disclosure are set forth in the accompanying drawings and the description below. Other features, objects, and advantages will be apparent from the description and drawings, and from the claims.

DETAILED DESCRIPTION

Figure 1:
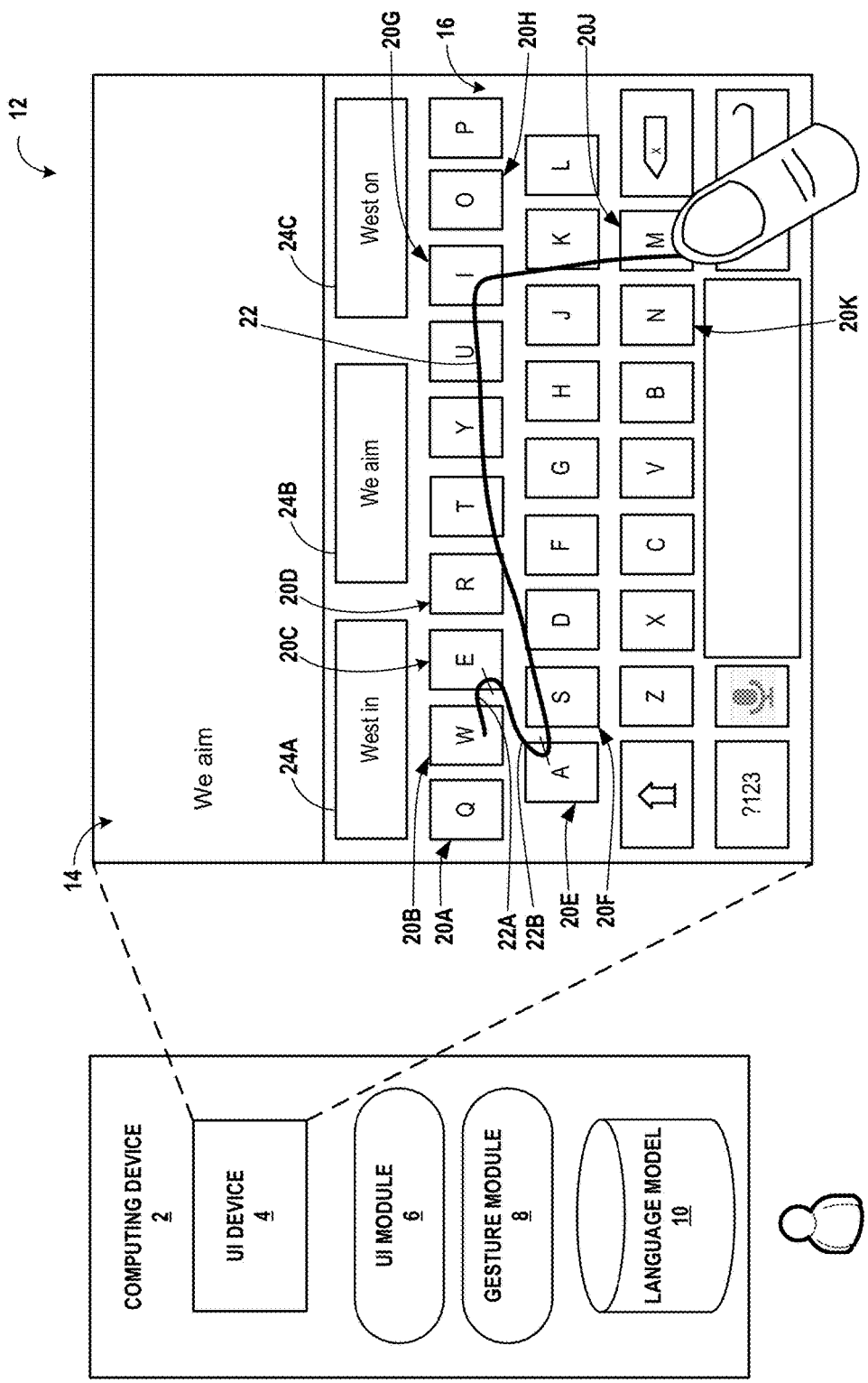
FIG. 1 is a block diagram illustrating an example computing device that may be used to incrementally determine text from a gesture, in accordance with one or more techniques of the present disclosure.

In general, this disclosure is directed to techniques for incrementally determining one or more candidate words of a candidate phrase based on a detected gesture (e.g., a gesture to select a sequence of characters included in a graphical keyboard). In some examples, a presence-sensitive display device that displays a graphical keyboard may also detect gestures. The presence-sensitive display (e.g., a touch-sensitive screen) may enable a user to input text by detecting user inputs in the form of gestures performed at or near the presence-sensitive display. In certain examples, a user may enter a string of text (for example a word or phrase), by performing one or more gestures at or near the presence-sensitive display. Techniques described herein may improve a user's ability to enter such text using a graphical keyboard.

For instance, rather than performing multiple discrete gestures to input a single word or phrase (e.g., multiple touch gestures, each discrete touch gesture to select a character of the word or phrase), techniques of this disclosure may enable a user to perform a single gesture that indicates the word or phrase. As an example, using techniques of this disclosure, a user may perform a continuous motion gesture that indicates a multi-word phrase without removing an input unit used to provide the gesture (e.g., a finger, pen, stylus, and the like) from the presence-sensitive display.

As the user performs the gesture, the computing device may incrementally determine a group of keys of the graphical keyboard indicated by the gesture. The incremental determinations may include searching for one or more points of a gesture that each align with a given keyboard position of a key that corresponds to a given letter. The search may include selecting a point of the gesture that best aligns with the letter of the keyboard.

To determine candidate words indicated by the gesture, the computing device may determine one or more word-level tokens, each of which includes a string of predicted characters indicated by the gesture. Each word-level token may be a prefix of one or more words included in a lexicon (e.g., dictionary). The computing device may determine one or more candidate words indicated by the gesture based on the word-level token. To determine candidate phrases, the computing device may determine one or more phrase-level tokens, each of which includes a plurality of character strings indicated by the gesture. That is, in addition to representing a prefix of one or more words included in the lexicon, a word-level token may itself represent a complete word included in the lexicon. A word-level token that represents a candidate word included in the lexicon may indicate that the next key indicated by the gesture represents the start of a new candidate word. As such, in response to determining that a word-level token represents a candidate word in the lexicon, the computing device may determine a phrase-level token that includes multiple character strings. As the user provides the gesture, the computing device may incrementally determine one or more candidate words and one or more candidate phrases indicated by the gesture.

As such, using techniques described herein, a computing device may determine one or more probable interpretations for a gesture based at least in part on both the gesture and various states in a lexicon in parallel. In this way, techniques disclosed herein may incrementally match the gesture to words and phrases in a data structure, such as a lexicon trie, one node/letter at a time, using a spatial and/or lexical gesture model.

By enabling the user to enter a multi-word phrase with a single gesture and performing incremental determinations to identify candidate words included in the phrase, techniques of this disclosure may enable the user to increase the rate at which text is entered. Consequently, techniques of the disclosure may relieve a user from performing a tap gesture for each letter of each word in a phrase, which may be difficult for a user and/or may result in a decreased text-entry rate due to the requirement that the user's finger discretely contact individual keys. Moreover, the user can, with a single gesture, select a number of keys that correspond to characters of multiple words in a phrase. In this way, the user can continuously swipe to select numerous characters, and techniques of the disclosure may automatically and incrementally determine whether the characters correspond to a single word or a phrase that includes a group of words. The techniques may also reduce a user's effort to accurately contact individual keys.

FIG. 1 is a block diagram illustrating an example computing device 2 that may be used to incrementally determine text from a gesture, in accordance with one or more techniques of the present disclosure. In some examples, computing device 2 may be associated with user 18. A user associated with a computing device may interact with the computing device by providing various user inputs into the computing device.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. Computing device 2, in some examples, may include user interface (UI) device 4, UI module 6, gesture module 8, and language model 10. Other examples of computing device 2 that implement techniques of this disclosure may include additional components not shown in FIG. 1.

Computing device 2 may include UI device 4. In some examples, UI device 4 may be configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that may display a graphical user interface and receive input from user 18 using capacitive, inductive, and/or optical detection at or near the presence-sensitive display.

As shown in FIG. 1, computing device 2 may include UI module 6. UI module 6 may perform one or more functions to receive input, such as user input, and send such input to other components associated with computing device 2, such as gesture module 8. For example, UI module 6 may determine a gesture performed by user 18 at UI device 4. UI module 6 may also receive data from components associated with computing device 2, such as gesture module 8. Using the data, UI module 6 may cause other components associated with computing device 2, such as UI device 4, to provide output based on the data. For instance, UI module 6 may receive data from gesture module 8 that causes UI device 4 to display information at committed-text region 14 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform a variety of operations on computing device 2, such as functionality to incrementally determine text from a gesture in accordance with the techniques described herein. Gesture module 8 may be implemented in various ways. For example, gesture module 8 may be implemented as a downloadable or pre-installed application or "app." In another example, gesture module 8 may be implemented as part of a hardware unit of computing device 2. In another example, gesture module 8 may be implemented as part of an operating system of computing device 2.

Gesture module 8 may receive data from components associated with computing device 2, such as UI module 6. For instance, gesture module 8 may receive gesture data from UI module 6 that causes gesture module 8 to determine text from the gesture data. In some examples, gesture module 8 determines one or more locations of UI device 4 that are touched or otherwise detected in response to a user gesture, based on information received from UI module 6. In some examples, gesture module 8 can determine one or more features associated with a gesture, such as the Euclidean distance between two alignment points, the length of a gesture path, the direction of a gesture, the curvature of a gesture path, the shape of the gesture, and maximum curvature of a gesture between alignment points, speed of the gesture, etc. Gesture module 8 may also send data to components associated with computing device 2, such as UI module 6. For instance, gesture module 8 may send text determined from the gesture data to UI module 6 that causes UI device 4 to display GUI 12.

As shown in FIG. 1, GUI 12 may be a user interface generated by UI module 6 that allows user 18 to interact with computing device 2. GUI 12 may include graphical content. Graphical content, generally, may include text, images, a group of moving images, etc. As shown in FIG. 1, graphical content may include graphical keyboard 16, committed-text region 14, and text-suggestion regions 24A-C (collectively "text-suggestion areas 24"). Graphical keyboard 16 may include a plurality of keys, such as "Q" key 20A, "W" key 20B, "E" key 20C, "R" key 20D, "A" key 20E, "S" key 20F, "T" key 20G, "O" key 20H, "M" key 20J, and "N" key 20K. In some examples, each of the plurality of keys included in graphical keyboard 16 represents a single character. In other examples, one or more of the plurality of keys included in graphical keyboard 16 represents a group of characters selected based on a plurality of modes.

In some examples, committed-text region 14 may include characters or other graphical content that are included in, for example, a text-message, a document, an e-mail message, a web browser, and the like. For instance, committed-text region 14 may include characters or other graphical content that are selected by user 18 via gestures performed at UI device 4. In some examples, text-suggestion regions 24 may each display a word and/or multi-word phrase. As illustrated in the example of FIG. 1, text-suggestion regions 24 may be different regions of GUI 12 than committed-text region 14. In other examples, text-suggestion regions 24 may be a single region of GUI 12, and may include one or more regions of GUI 12 that are the same as committed-text region 14. Similarly, while illustrated as separate regions in the example of FIG. 1, text-suggestion regions 24, in some examples, may be a single region of GUI 12.

UI module 6 may cause UI device 4 to display graphical keyboard 16 and detect a gesture having gesture path 22 which is incrementally determined by gesture module 8 in accordance with techniques described herein. Additionally, UI module 6 may cause UI device 4 to display a candidate word and/or phrase determined from the gesture in one or more of text-suggestion regions 24.

Graphical keyboard 16 may be displayed by UI device 4 as an ordered set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 1, graphical keyboard 16 includes a version of the traditional "QWERTY" keyboard layout for the English language providing character keys as well as various keys (e.g., the "?123" key) providing other functionality.

Computing device 2, in some examples, includes language model 10. Language model 10 may include a lexicon. In some examples, a lexicon may include a listing of words and may include additional information about the listed words. A lexicon may be represented by one or more data structures, such as by one or more of an array, a list, a tree, or other data structures. For example, language model 10 may include a lexicon stored in a trie data structure. A lexicon trie data structure may include a plurality of nodes. Each node of the lexicon trie may represent a letter. The first node in a lexicon trie may be considered an entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word) included in the lexicon. The letters indicated by the nodes along a path of nodes from the entry node to a terminal node may spell out a word indicated by the terminal node. In some examples, language model 10 may be a default dictionary installed on computing device 2. In certain examples, language model 10 may include a group of predefined phrases installed on computing device 2. In other examples, language model 10 may include multiple sources of lexicons, which may be stored at computing device 2 or stored at one or more remote computing devices that are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(m-1)}, \ldots, x_{i-1})$). For instance, a bigram language model (an n-gram model where n=2), may provide a probability that the letter "w" follows the sequence of letters "no". As another example, a trigram language model (an n-gram model where n=3) may provide a probability that the word "to" follows the sequence of words "we aim". In certain examples, a trigram language model may provide a probability that a delimiter character (e.g., a comma delimiter character, a period delimiter character, a semicolon delimiter character) is positioned between a first character string and a second character string. For instance, a trigram language model may provide a probability that a comma delimiter character is positioned between a first character string "example" and a second character string "the." In some examples, language model 10 includes a lexicon trie with integrated language model frequency information. For instance, each node of the lexicon trie may include a representation of a letter and a probability value.

Techniques of the present disclosure may improve the speed and accuracy with which a user can enter text into a computing device. Using techniques of this disclosure, a user may, instead of performing a discrete gesture for each key of a word, perform a single gesture that indicates the word. Similarly, according to techniques described herein, a user may perform a single gesture that indicates characters of multiple words (e.g., two words, three words, five words, or other numbers of words) in a phrase.

As the user performs the gesture, the computing device may incrementally determine a group of keys indicated by the gesture. Each key may be associated with one or more characters. The computing device may determine, based on the determined group of keys, one or more word-level tokens, each of the word-level tokens including a single string of a plurality of predicted characters. The computing device may determine one or more candidate words indicated by the gesture based on the word-level tokens. In addition, the computing device may determine that a word-level token itself represents a complete word included in a lexicon. In response, the computing device may determine a phrase-level token that includes a plurality of character strings. For instance, the computing device may determine the phrase-level token as a combination of the word-level token that represents the complete word included in the lexicon and another word-level token that begins with a next selected key indicated by the gesture. By incrementally decoding the gesture as it is being performed, the user may be presented with a candidate word and/or phrase with minimal post-gesture entry processing time. Moreover, by enabling the user to enter a word and/or phrase with a single gesture, techniques of this disclosure may enable the user to increase the rate at which text is entered.

As shown in the example of FIG. 1, UI module 6 may output GUI 12 including graphical keyboard 16 for display at UI device 4. UI device 4 (e.g., a presence-sensitive and/or touch-sensitive display) may detect a gesture to select one or more keys of graphical keyboard 16. In one example, the gesture may be a continuous motion gesture that includes a motion of an input unit (e.g., a finger, pen, stylus, etc.) from a first location of UI device 4 to a second location of UI device 4 such that the gesture performed from the first location to the second location is detected by UI device 4 throughout the performance of the gesture. For instance, such as when UI device 4 includes a touch-sensitive display, the gesture may include a motion of an input unit from the first location to the second location with substantially constant contact between the input unit and UI device 4. As illustrated in the example of FIG. 1, UI device 4 may detect a gesture including gesture path 22 provided by a finger of user 18 from a location of UI device 4 that displays "W" key 20B to a location of UI device 4 that displays "M" key 20J along gesture path 22 such that UI device 4 detects the finger throughout gesture path 22.

The gesture may include a plurality of portions. In some examples, the gesture may be divided into portions with substantially equivalent time durations. Where the gesture includes a plurality of portions, the gesture may include a final portion which may be a portion of the gesture detected prior to detecting that the gesture is complete. For instance, a portion of the gesture may be designated as the final portion where user 18 moves his/her finger out of proximity with UI device 4 such that the finger is no longer detected by UI device 4.

As illustrated, user 18 may perform a gesture to select a group of keys of the plurality of keys. In the example of FIG. 1, UI module 6 may incrementally detect the gesture having gesture path 22 at the presence-sensitive display as user 18 performs the gesture by tracing gesture path 22 through or near keys of keyboard 16 that correspond to the characters of a desired phrase (e.g., the characters corresponding to the phrase "we aim", represented by "W" key 20B, "E" key 20C, "A" key 20E, "I" key 20G, and "M" key 20J). UI module 6 may send data that indicates gesture path 22 to gesture module 8. In some examples, UI module 6 incrementally sends data indicating gesture path 22 to gesture module 8 as gesture path 22 is detected by UI device 4 and received by UI module 6. For instance, UI module 6 may send a stream of coordinate pairs indicating gesture path 22 to gesture module 8 as gesture path 22 is detected by UI device 4 and received by UI module 6. As in the example of FIG. 1, gesture module 8 may receive an indication of gesture path 22 from UI module 6, including portion 22A of gesture path 22 to select "E" key 20C and portion 22B of gesture path 22 to select "A" key 20E.

In response to receiving data that represents gesture path 22, gesture module 8 may determine one or more word-level tokens, each of the word-level tokens including a single string of a plurality of predicted characters. For example, based at least in part on the indication of portion 22A of gesture path 22, gesture module 8 may determine one or more word-level tokens, each of the word-level tokens including a single string of predicted characters indicated by portion 22A. As an example, gesture module 8 may determine a first word-level token as the string of predicted characters "qe" corresponding to an indication of a predicted selection of "Q" key 20A and "E" key 20C. Similarly, gesture module 8 may determine a second word-level token as the string of predicted characters "we" corresponding to an indication of a predicted selection of "W" key 20B and "E" key 20C. Gesture module 8 may incrementally determine multiple such word-level tokens based at least in part on one or more selected keys of graphical keyboard 16. Each character of each word-level token may be associated with a region of UI device 4 that displays a key corresponding to the character. Gesture module 8 may determine the one or more word-level tokens based on observed touch points relative to the area of UI device 4 that displays the one or more keys corresponding to the one or more characters of the word-level token.

Each of the word-level tokens including the single string of predicted characters may be a prefix of a word included in the lexicon. Gesture module 8 may determine one or more candidate words based at least in part on the one or more word-level tokens. A candidate word may be a word suggested to the user that is composed of a group of keys indicated by gesture path 22. As an example, as described above, gesture module 8 may determine one or more word-level tokens in response to receiving an indication of portion 22A of gesture path 22, such as a first word-level token including the string of predicted characters "qe", a second word-level token including the string of predicted characters "we", a third word-level token including the string of predicted characters "wr", or other word-level tokens. One or more of the word-level tokens may be a prefix of a word included in a lexicon. Gesture module 8 may, in certain examples, incrementally determine one or more candidate words as one or more of the words included in the lexicon for which a word-level token is a prefix.

Additionally, one or more of the word-level tokens may represent a candidate word included in the lexicon. For instance, in the present example, gesture module 8 may determine that the second word-level token including the string of predicted characters "we", in addition to being a prefix of words included in the lexicon (e.g., the words "went", "were", etc.), itself represents a candidate word included in the lexicon (i.e., the word "we" in the English language). As such, gesture module 8 may determine that a next selected key indicated by gesture path 22, rather than representing a next letter of a word for which the string of characters "we" is a prefix, may represent a first letter of a next word. In response to determining that the word-level token represents the candidate word in the lexicon, gesture module 8 may determine a phrase-level token based at least in part on the word-level token and a next predicted character key as indicated by gesture path 22.

For example, as illustrated in the example of FIG. 1, UI module 6 may receive an indication of portion 22B of gesture path 22 detected at UI device 4. Gesture module 8 may receive data from UI module 6 corresponding to the indication of portion 22B of gesture path 22. In response to determining that the word-level token including the single string of predicted characters "we" represents a candidate word included in the lexicon, gesture module 8 may generate a phrase-level token based at least in part on a next selected character as indicated by portion 22B of gesture path 22. For instance, gesture module 8 may determine a phrase-level token including the plurality of character strings "we" and "a" separated by a space character. That is, the phrase-level token may include the word-level token that represents the candidate word in the dictionary and a next word-level token that begins with the next predicted character as indicated by portion 22B of gesture path 22.

Gesture module 8 may determine candidate phrases based on the phrase-level token, such as by determining a candidate phrase as a combination of the word-level token that represents the candidate word in the dictionary and a candidate word for which the next word-level token that begins with the next predicted character is a prefix. As an example, gesture module 8 may determine one or more candidate phrases, such as the phrase "we are", the phrase "we ask", and the like. In some examples, gesture module 8 may cause UI module 6 to output one or more of the candidate phrases for display at text-suggestion regions 24.

In addition to determining the phrase-level token based at least in part on the indication of the next selected character, gesture module 8 may determine a word-level token based at least in part on the next selected character. For example, gesture module 8 may determine a phrase-level token based at least in part on the word-level token including the plurality of character strings "we" and "a" separated by a space character, and may determine a word-level token that includes the single string of predicted characters "wea". That is, gesture module 8 may incrementally determine predicted words and predicted phrases indicated by gesture path 22 in parallel, thereby enabling a user to provide one continuous gesture to select a group of keys included in both candidate words and candidate phrases.

Gesture module 8 may determine the one or more word-level tokens and phrase-level tokens by determining a group of alignment points traversed by gesture path 22, determining respective cost values for each of at least two keys of the plurality of keys, and comparing the respective cost values for at least each of at least two keys of the plurality of keys, as further described below.

An alignment point is a point along gesture path 22 that may indicate a key of the plurality of keys included in graphical keyboard 16. An alignment point may include one or more coordinates corresponding to the determined position of the alignment point. For instance, an alignment point may include Cartesian coordinates corresponding to a point on GUI 12.

In some examples, gesture module 8 determines the group of alignment points traversed by gesture path 22 based on a plurality of features associated with gesture path 22. The plurality of features associated with gesture path 22 may include a length of a segment of gesture path 22. For instance, gesture module 8 may determine the length along the gesture segment from a previous alignment point and the current alignment point. For better alignments, the length will more closely approximate the straight-line distance between to two corresponding keyboard letters.

In another example, gesture module 8 may determine a direction of a segment from a first point to a second point of gesture path 22 to determine the group of alignment points. For better alignments, the direction of the segment will more closely approximate the direction of a straight line from between two corresponding keyboard letters.

In some examples, gesture module 8 may determine features of gesture path 22 such as a curvature of a segment of gesture path 22, a local speed representing a rate at which a segment of path 22 was detected, and a global speed representing a rate at which gesture path 22 was detected. If gesture module 8 determines a slower speed or pause for the local speed, gesture module 8 may determine that a point at the segment is more likely to be an alignment point. If gesture module 8 determines that a gesture was drawn quickly, gesture module 8 may determine that the gesture is more likely to be imprecise and therefore gesture module 8 may apply a greater weight on the language module (i.e., n-gram frequencies) than the spatial model. In one example, gesture module 8 may determine an alignment point of the group of alignment points based on a segment of gesture path 22 having a high curvature value. Additionally, gesture module 8 may determine an alignment point of the group of alignment points based on a segment of gesture path 22 having a low local speed (i.e., the user's finger slowed down while performing the segment of the gesture). In the example of FIG. 1, gesture module 8 may determine a first alignment point at the start of gesture path 22, a second alignment point at the point where gesture path 22 experiences a significant change in curvature, and a third alignment point at the end of gesture path 22. In still other examples, techniques of the disclosure may identify a shape of the gesture as a feature and determine an alignment point based on the shape of the gesture.

In some examples, gesture module 8 may determine respective cost values for each of at least two keys of the plurality of keys included in keyboard 16. Each of the respective cost values may represent a probability that an alignment point indicates a key. In some examples, the respective cost values may be based on physical features of the gesture path, the alignment point, and/or the key. For instance, the respective cost values may be based on the physical location of the alignment point with reference to the physical location of the key.

In some examples, the respective cost values may be based on language model 10. For instance, the respective cost values may be based on the probability that a second key will be selected after a first key (e.g., the probability that the "e" key will be selected after the "w" key). As another example, the respective cost values may be based on the probability that a second candidate word will follow a first candidate word (e.g., the probability that the candidate word "aim" will follow the candidate word "we"). In certain examples, the keys for which respective cost values are determined are selected based at least in part on language model 10. In some examples, the cost values are lower where there is a greater likelihood that an alignment point indicates a key. In other examples, the cost values are higher where there is a greater likelihood that an alignment point indicates a key.

In certain examples, language model 10 may include frequency information regarding a probability that one or more delimiter characters are positioned between a first character string and a second character string of a phrase-level token. For instance, a phrase-level token may include a first character string including the characters "John" and a second character string including the characters "this". In such an example, language model 10 (e.g., an n-gram language model) may include frequency information indicating a probability that one or more delimiter characters are positioned between the first character string (e.g., the character string "John") and the second character string (e.g., the character string "this").

For instance, language model 10 may include frequency information indicating a probability that a comma delimiter is positioned between the first character string "John" and the second character string "this". In some examples, computing device 2 may determine a phrase-level token as including one or more delimiter characters positioned between the first character string and the second character string based at least in part on the probability indicated by language model 10 that the delimiter character is positioned between the first and second character strings of the phrase-level token. As such, in certain examples, computing device 2 may automatically insert one or more delimiter characters in a candidate phrase, thereby enabling a user to provide a single continuous gesture to select one or more characters of a phrase without providing an input to affirmatively select the one or more delimiter characters. As such, in certain examples, graphical keyboard 16 may not include keys associated with one or more delimiter characters. For instance, in some examples, graphical keyboard 16 may not include keys associated with one or more of a space delimiter character, a period character, a comma character, a hyphen character, an apostrophe character, or other delimiter characters.

Examples of such delimiter characters may include, but are not limited to, one or more of a comma delimiter character, a period delimiter character, a semicolon delimiter character, a question mark delimiter character, a hyphen delimiter character, an apostrophe delimiter character, or other punctuation delimiter characters. In general, a delimiter character may include any character (e.g., punctuation character or otherwise) that may be used to separate or otherwise delimit characters or strings of characters. As an example, in the example of FIG. 1, language model 10 may include a probability that a comma delimiter character is positioned between the character string "We" and the character string "aim". As another example, language model 10 may include a probability that a period delimiter character is positioned between the character string "West" and the character string "on".

In some examples, language model 10 may include a probability that more than one delimiter character is positioned between the first and second character strings. For instance, a first character string may include the characters "e.g" and a second character string may include the characters "the". In such an example, language model 10 may include a probability that both a period delimiter character and a comma delimiter character are positioned between the first and second character strings, such that the phrase-level token includes the phrase "e.g., the" (i.e., the first character string "i.e" followed by a period delimiter character and a comma delimiter character). As another example, language model 10 may include a probability that multiple delimiter characters, such as a period delimiter character and two space delimiter characters are positioned between the first and second character strings. For instance, a first character string may include the characters "end" and a second character string may include the characters "next". In such an example, language model 10 may include a probability that a period delimiter character and two space delimiter characters are positioned between the first and second character strings, such that the phrase-level token includes the phrase "end. Next".

Gesture module 8 may, in certain examples, insert one or more delimiter characters between a first character string of a phrase-level token and a second character string of the phrase-level token. For example, gesture module 8 may compare the probability that the one or more delimiter characters are positioned between the first and second character strings to a threshold value (e.g., a threshold probability, such as sixty percent, seventy percent, ninety percent, or other probabilities). Gesture module 8 may insert the one or more delimiter characters between the first and second character strings when the determined probability satisfies the threshold value, such as when the determined probability is greater than (or equal to) the threshold value.

In some examples, gesture module 8 may determine a first phrase-level token that does not include the one or more delimiter characters and a second phrase-level token that includes the one or more delimiter characters. In such examples, gesture module 8 may determine respective cost values for each of the characters included the first phrase-level token that does not include the one or more delimiter characters. Similarly, gesture module 8 may determine respective cost values for each of the characters included in the second phrase-level token that includes the one or more delimiter characters. Gesture module 8 may determine one or more candidate phrases based at least in part on the respective cost values for the first phrase-level token and the second phrase-level token. In such a way, gesture module 8 may incrementally determine one or more candidate phrases indicated by a gesture, the one or more candidate phrases including one or more delimiter characters positioned between character strings of the candidate phrase.

In the example of FIG. 1, gesture module 8 may determine a first cost value representing a probability that the first alignment point indicates "Q" key 20A and a second cost value representing a probability that the first alignment point indicates "W" key 20B. Similarly, gesture module 8 may determine a third cost value representing a probability that the second alignment point indicates "E" key 20C and a fourth cost value representing a probability that the second alignment point indicates "R" key 20D. In this way, gesture module 8 may incrementally determine cost values, each representing a probability that an alignment point indicates a key of the plurality of keys included in graphical keyboard 16. For instance, gesture module 8 may determine cost values representing probabilities that alignment points indicate "A" key 20E, "S" key 20F, "I" key 20G, "O" key 20H, "M" key 20J, "N" key 20K, or other keys included in the plurality of keys.

Gesture module 8 may compare the respective cost values for at least two keys of the plurality of keys to determine a combination of keys having a combined cost value that satisfies a threshold. A combined cost value may represent a probability that gesture path 22 indicates a combination of keys. Gesture module 8 may compare the respective cost values for at least two keys of the plurality of keys to determine which of the at least two keys is indicated by an alignment point. Gesture module 8 may determine a combination of keys by determining which keys are indicated by each alignment point. In some examples, gesture module 8 determines which of the at least two keys is indicated by an alignment point without regard to which keys are indicated by other alignment points. In other examples, gesture module 8 determines which of the at least two keys is indicated by the alignment point based on which keys are indicated by other alignment points. In such examples, gesture module 8 may revise the determination of which key is indicated by a previous alignment point based on the respective cost values for a current alignment point.

In some examples, gesture module 8 may compare the combined cost value of a determined combination of keys with a threshold value. In some examples, the threshold value is the combined cost value of a different determined combination of keys. For instance, gesture module 8 may determine a first combination of keys having a first combined cost value and a second combination of keys having a second combined cost value. In such an instance, gesture module 8 may determine that a candidate word or phrase is based on the combination of keys with the lower combined cost value. In the example of FIG. 1, gesture module 8 may compare the determined respective cost values to determine a combination of keys (i.e., "W", "E", "A", "I", and "M") having a combined cost value.

In some examples, gesture module 8 begins to determine a candidate word and/or phrase prior to the time in which UI device 4 completes detecting gesture path 22. In the example of FIG. 1, rather than determining the candidate word and/or phrase after UI device 4 completes detecting gesture path 22, gesture module 8 may determine a plurality of words and/or phrases as gesture path 22 is detected, such as "we", "went", "wear", "we are" "we aim", and "we aimed". Additionally, in the example of FIG. 1, gesture module 8 may contemporaneously revise the determined plurality of words as gesture path 22 is detected, such as revision of "we" to "wear". Furthermore, rather than determining the candidate word and/or phrase based on a geometric shape of the gesture, techniques of the disclosure may determine a candidate word and/or phrase based on a group of characters indicated by the gesture. Gesture module 8 may send the determined word and/or phrase to UI module 6 which may then cause UI device 4 to display the word and/or phrase (e.g., the phrase "we aim") in committed-text region 14 of GUI 12.

In some alternative embodiments, a user can provide an indication that a character associated with a key should be included in the candidate word and/or phrase, such as by pausing for a threshold time duration at a key to indicate that the character should be included in the candidate word and/or phrase. Similarly, a user may provide an indication that a next selected key should be included in a next word of a candidate phrase, such as by pausing for a threshold time duration at or near the last letter of a word prior to extending the gesture to the first letter of the next word, or performing a motion gesture at or near the last letter of a word prior to extending the gesture to the first letter of the next word (e.g., a looping gesture, an upward motion gesture, a downward motion gesture, a motion gesture in a direction toward a space key, etc). In another alternative embodiment, rather than using a trie based search as described using techniques of the disclosure, gesture module 8 may maintain a separate gesture-specific word list or dictionary.

In some examples, techniques of the disclosure provide for efficient performance on computing devices, for instance, recognizing gestures in fewer than 100 milliseconds in some cases. Techniques of the disclosure may also use the default dictionary installed on the mobile device rather than using a dedicated gesture dictionary that may be maintained separately and use additional storage resources.

In this way, techniques of the disclosure may reduce storage requirements by using a dictionary that is already stored by a default input entry system. Moreover, the dictionary may be implemented efficiently as a compact lexicon trie. Using a default dictionary already provided on a computing device also provides ready support foreign languages, contact names, and user added words in accordance with techniques of the disclosure. By using, e.g., a lexicon trie and the default dictionary, techniques of the disclosure may integrate the language model frequencies (i.e., n-gram probabilities) into the gesture interpretation, thereby allowing the search techniques to concentrate on the most promising paths for candidate words based on both the shape of the gesture and the probability of the word being considered.

Additionally, by incrementally determining the selected keys of the plurality of keys indicated by the gesture using both a spatial model and a language model, techniques described herein may enable the computing device to determine a candidate word and/or phrase that is not included in the lexicon. For instance, based on a combination of the spatial model including a determination of alignment points traversed by the gesture and other features of the gesture (e.g., a local speed of one or portions of the gesture, a global speed of the gesture, a curvature of one or more portions of the gesture, etc.) and the language model (e.g., n-gram frequencies of predicted characters and/or words), the computing device may determine that a most probable group of keys indicated by the gesture includes a group of keys that does not spell a word included in the lexicon. As such, according to techniques described herein, the computing device may enable a user to provide a single gesture to select a group of keys that does spell a word included in the lexicon, such as an abbreviation or other such character string.

Figure 2:
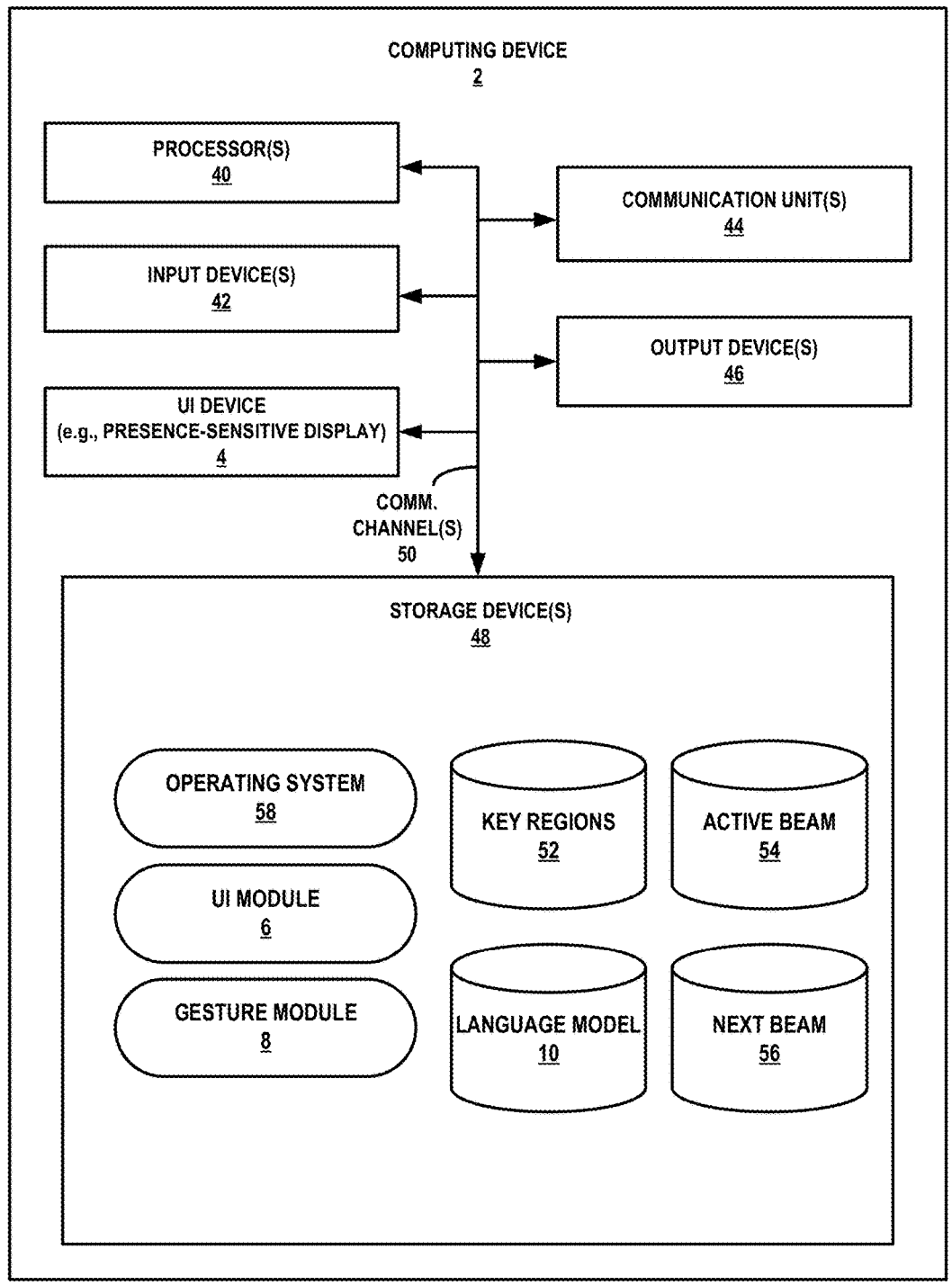
FIG. 2 is a block diagram illustrating further details of one example of a computing device as shown in FIG. 1, in accordance with one or more techniques of the present disclosure.

FIG. 2 is a block diagram illustrating further details of one example of a computing device shown in FIG. 1, in accordance with one or more techniques of the present disclosure. FIG. 2 illustrates only one particular example of computing device 2 as shown in FIG. 1, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example further includes UI module 6, gesture module 8, and operating system 58 that are executable by computing device 2 (e.g., by one or more processors 40). Computing device 2, in one example, further includes language model 10, key regions 52, active beam 60, and next beam 56.

Each of components 4, 40, 42, 44, 46, and 48 may be interconnected (physically, communicatively, and/or operatively) for inter-component communications. In some examples, communication channels 50 may include a system bus, a network connection, an inter-process communication data structure, or any other method for communicating data. As one example in FIG. 2, components 4, 40, 42, 44, 46, and 48 may be coupled by one or more communication channels 50. UI module 6 and gesture module 8 may also communicate information with one another as well as with other components in computing device 2, such as language model 10, key regions 52, active beam 54, and next beam 56.

Processors 40, in one example, are configured to implement functionality and/or process instructions for execution within computing device 2. For example, processors 40 may be capable of processing instructions stored in storage device 48. Examples of processors 40 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., gesture module 8) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

In some examples, UI device 4 may include functionality of input device 42 and/or output device 46. In one example, UI device 4 may be a touch-sensitive screen. In the example of FIG. 2, UI device 4 may be a presence-sensitive display. In some examples, a presence sensitive display may detect an object, such as an input unit (e.g., user's finger, stylus, etc.) at and/or near the screen of the presence-sensitive display. As one example range, a presence-sensitive display may detect a user's finger that is within 2 inches or less of the physical screen of the presence-sensitive display. The presence-sensitive display may determine one or more locations (e.g., (x,y) coordinates) of the presence-sensitive display at which the finger was detected. In another example range, a presence-sensitive display may detect an object 6 inches or less from the physical screen of the presence-sensitive display and other exemplary ranges are also possible. The presence-sensitive display may determine the location of the display selected by a user's finger using capacitive, inductive, and/or optical recognition techniques. In some examples, the presence sensitive display provides output to a user using tactile, audio, or video stimuli as described with respect to output device 46.

Computing device 2 may include operating system 58. Operating system 58, in some examples, controls the operation of components of computing device 2. For example, operating system 58, in one example, facilitates the communication of UI module 6 and/or gesture module 8 with processors 40, communication unit 44, storage device 48, input device 42, and output device 46. UI module 6 and gesture module 8 may each include program instructions and/or data that are executable by computing device 2. As one example, UI module 6 may include instructions that cause computing device 2 to perform one or more of the operations and actions described in the present disclosure.

Computing device 2 may include active beam 54. Active beam 54, in some examples, is configured to store one or more tokens (e.g., one or more word-level tokens and/or phrase-level tokens) generated by gesture module 8. Active beam 54 may be included within storage devices 48. The specific functionality of active beam 54 is further described in the description of FIG. 3, below.

Computing device 2 may also include next beam 56. Next beam 56, in some examples, is configured to store one or more tokens generated by gesture module 8 (e.g., one or more word-level tokens and/or phrase-level tokens). Next beam 56 may be included within storage devices 48. The specific functionality of next beam 56 is further described in the description of FIG. 3, below.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include communication unit 44.

In accordance with the techniques of this disclosure, computing device 2 may output a graphical keyboard comprising a plurality of keys at output device 46. User 18 may perform a gesture to select a group of keys of the plurality of keys at input device 42. In response to user 18 performing the gesture, input device 42 may detect a gesture path, such as gesture path 22 of FIG. 1, which may be received by UI module 6 as gesture path data. The gesture path may include a first portion of the gesture to select a first key of the plurality of keys (e.g., portion 22A of gesture path 22) and a second portion of the gesture to select a second key of the plurality of keys (e.g., portion 22B of gesture path 22). Gesture module 8 may receive the gesture path data from UI module 6. In some examples, UI module 6 incrementally sends the gesture path data to gesture module 8 as gesture path 22 is detected by input device 42.

In response to receiving the gesture path data, gesture module 8 may create a token at the entry node of a lexicon which may be included in language model 10. In some examples, language module 10 may be implemented as a trie data structure. Each movable token may represent a partial alignment between a node in the lexicon (i.e., a partial word and/or phrase) and a point along the gesture. As the token advances to child nodes in the lexicon (i.e., next letters in the word and/or next words of a phrase) the corresponding alignment point on the gesture may advance as well. As the token advances to the next letter in a word or to the next word in a phrase, techniques of the disclosure may determine how far the token needs to advance along the gesture path. For instance, techniques of the disclosure may include searching for an alignment point along the gesture that best aligns to a letter of a key, taking into account a number of features described below.

As described in FIG. 1, a lexicon trie data structure may contain a plurality of nodes, each node may represent a letter. Gesture module 8 may push the token into active beam 54. Gesture module 8 may create a token copy on each of the token's child nodes. In the example of FIG. 1, gesture module 8 may create a first word-level token copy on the child node representing the letter "W" (e.g., corresponding to a predicted key selection of "W" key 20B) and a second token copy on the child node representing the letter "Q" (e.g., corresponding to a predicted key selection of "Q" key 20A). Each of the word-level tokens may include a single string of predicted characters.

For each token copy, gesture module 8 may determine, based on a plurality of features associated with the gesture path data, an alignment point traversed by the gesture. In the example of FIG. 1, gesture module 8 may determine that a first alignment point is located at the start of gesture path 22. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (i.e., a point was missed in-between).

In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line.

For each alignment point, gesture module 8 may determine respective cost values for each of at least two keys of the plurality of keys. Each of the respective cost values may represent a probability that the alignment point indicates a key of the plurality of keys. In the example of FIG. 1, gesture module 8 may determine a first cost value representing a probability that the first alignment point indicates the node representing the letter "W" and a second cost value representing a probability that the first alignment point indicates the node representing the letter "Q". In some examples, gesture module 8 may then update the token copy with the respective alignment point and/or cost value and push the token copy in next beam 56. In the example of FIG. 1, gesture module 8 may add the first cost value to the first token copy and the second cost value to the second token copy.

In some examples, gesture module 8 determines the respective cost values by comparing respective physical cost values with respective lexical cost values, as further described below. In some examples, gesture module 8 may apply one or more weighting factors to the respective physical cost values, and may apply one or more different weighting factors to the respective lexical cost values. For instance, gesture module 8 may determine a cost value by summing the result of multiplying a physical cost value by a physical weighting factor, and multiplying a lexical cost value by a lexical weighting factor.

In some examples, gesture module 8 may determine that one or more lexical weighting factors applied to the one or more lexical cost values should be greater in magnitude than a magnitude of one or more respective physical weighting factors applied to the one or more physical cost values, such as where the gesture path is detected at high rate of speed. For instance, gesture module 8 may determine that a value associated with a feature (e.g., speed) satisfies one or more thresholds, such as when a global speed of the gesture is greater than or equal to a threshold value, less than or equal to a threshold value, etc. In certain examples, gesture module 8 may determine that the physical cost values are unreliable if the determined value satisfies a threshold. In some examples, gesture module 8 may use statistical machine learning to adapt to the style of the user and modify the weighting values over time. For instance, gesture module 8 may, in response to determining that the user is inaccurate while performing gestures, weight the lexical cost values greater than the physical cost values. In some examples, gesture module 8 may determine that the physical cost values should be weighted greater than the lexical cost values. Gesture module 8 may determine that the physical cost values should be weighted greater than the lexical cost values where there is an indication that the lexical cost values may be unreliable, such as where the user has a history of entering words not included in the lexicon. In some examples, the weighting values may be estimated and optimized heuristically, such as by measuring accuracy from a plurality of computing devices.

Gesture module 8 may determine respective physical cost values for each of the at least two keys of the plurality of keys. Each of the respective physical cost values may represent a probability that physical features of an alignment point of the group of alignment points indicate physical features of a key of the plurality of keys. For instance, gesture module 8 may determine the respective physical cost values by evaluating the Euclidian distance between an alignment point of the group of alignment points and a keyboard position of key.

Physical features of the plurality of keys may be included in key regions 52. For example, key regions 52 may include, for each of the plurality of keys, a set of coordinates that correspond to a location and/or area of graphical keyboard 16 where each key is displayed. In the example of FIG. 1, gesture module 8 may determine a first physical cost value based on the Euclidian distance between the first alignment point and "W" key 20B. In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (i.e., that the second letter is more probable where the distances are more similar). For instance, a smaller distance may suggest a better alignment.

Gesture module 8 may also determine the respective cost values by determining respective lexical cost values for each of the at least two keys of the plurality of keys. Each of the respective lexical cost values may represent a probability that a letter represented by a key of the plurality of keys is included in a candidate word based on the word-level token. The lexical cost values may be based on language model 10. For instance, the lexical cost values may represent the likelihood that a given letter is selected based on probable words included in language model 10. In the example of FIG. 1, gesture module 8 may determine a first lexical cost value based on an entry in language model 10 indicating a frequency that the letter "W" is the first letter in a word.

Gesture module 8 may determine whether the token is at a terminal node of the lexicon. A terminal node of the lexicon may be a node that represents a complete word included in the lexicon. For instance, in the example of FIG. 1, gesture module 8 may determine, based at least in part on the indication of portion 22A of gesture path 22, a word-level token including the single string of predicted characters "we". Such a word-level token may represent a prefix of one or more candidate words included in the lexicon, such as the words "went", "were", "weather", and the like. In addition, the word-level token may itself represent a complete word included in the lexicon, such as the word "we" in the English language. In response to determining that the word-level token represents a candidate word included in the lexicon, gesture module 8 may generate a next-word token. The next-word token may indicate that a next selected key of the plurality of keys is a prefix of a second word-level token.

As such, in response to receiving an indication of a portion of the gesture to select a next key of the plurality of keys, gesture module 8 may create a token copy on each of the word-level token's child nodes to include a predicted character indicated by the received portion of the gesture. In addition, in response to receiving the indication of the portion of the gesture to select the next key of the plurality of keys, gesture module 8 may create a phrase-level token that includes a second word-level token including a second string of predicted characters for which the predicted character is a prefix. Gesture module 8 may determine the phrase-level token as a combination of the first word-level token that represents the candidate word included in the lexicon and the second word-level token. Accordingly, gesture module 8 may incrementally determine one or more candidate words indicated by the gesture and one or more candidate phrases indicated by the gesture in parallel.

As an example, gesture module 8 may receive an indication of portion 22A of gesture path 22. In response, gesture module 8 may determine a first word-level token including the single string of predicted characters "we". Gesture module 8 may determine one or more candidate words indicated by the gesture using the first word-level token. For instance, gesture module 8 may determine one or more candidate words for which the single string of predicted characters is a prefix, such as the words "were", "went", and the like. In addition, gesture module 8 may determine that the first word-level token including the single string of predicted characters "we" represents a candidate word included in the lexicon, such as the word "we" in the English language. In response, gesture module 8 may generate a next-word token that indicates that a next selected key is a prefix of a second word-level token.

In the present example, as the user continues to perform the gesture, gesture module 8 may receive an indication of portion 22B of gesture path 22. In response, gesture module 8 may create a token copy on each of the word-level token's child nodes to include a predicted character indicated by the received portion of the gesture, such as the letter "a" corresponding to a predicted selection of "A" key 20E. As such, gesture module 8 may advance the first word-level token to include the single string of predicted characters "wea". Based on the first word-level token, gesture module 8 may determine one or more candidate words indicated by the gesture, such as words included in the lexicon for which the single string of predicted characters "wea" is a prefix (e.g., the words "wear", "weather", and the like).

In addition, in the present example, gesture module 8 may determine, in response to generating the next-word token that indicates that a next selected key is a prefix of a second word-level token, a second word-level token that includes the predicted character "a" corresponding to the predicted selection of "A" key 20E. In this example, gesture module 8 may determine a phrase-level token as a combination of the first word-level token including the single string of predicted characters "we" and the second word-level token including the single string of predicted characters "a". Gesture module 8 may determine one or more candidate words for which the single string of predicted characters "a" included in the second word-level token is a prefix, such as the words "are", "am", and the like. Gesture module 8 may determine one or more candidate phrases indicated by the gesture as a combination of the first word-level token that represents the candidate word in the lexicon (i.e., the word "we" in the present example) and the one or more candidate words for which the single string of predicted characters included in the second word-level token is a prefix (e.g., the words "are", "am", etc.) Gesture module 8 may, in certain examples, determine the one or more candidate phrases indicated by the gesture using the lexical model (e.g., language model 10), such as by determining a probability that a given candidate word associated with the second word-level token follows the candidate word associated with the first word-level token. For instance, in this example, gesture module 8 may determine that a candidate word "are" is more likely to follow the candidate word "we" than the candidate word "am", as the phrase "we are" may be more have a higher probability in language model 10 than the phrase "we am".

In certain examples, gesture module 8 may maintain a threshold number of word-level and/or phrase-level tokens (e.g., fifty tokens, one hundred tokens, two hundred tokens, or other numbers of tokens) and discard the rest. For instance, gesture module 8 may maintain a group of the one hundred word-level and/or phrase-level tokens that include the most likely words and/or character strings indicated by the gesture, as determined based on the spatial and language models. In this way, gesture module 8 may efficiently scale to large lexicons.

In some examples, gesture module 8 may select a character string included in the phrase-level token as a committed character string, and may output the committed character string for display at the presence-sensitive display, such as at committed-text region 14 of GUI 12. For example, a user may provide a gesture at graphical keyboard 16 to select a group of keys corresponding to the phrase "this is a delightful keyboard". In response to receiving the indication of the gesture, gesture module 8 may determine one or more phrase level tokens including a plurality of predicted character strings. Gesture module 8 may determine that a phrase-level token satisfies a threshold, such as a threshold number of word-level tokens included in the phrase-level token. In response to determining that the phrase-level token satisfies the threshold, gesture module 8 may select one or more character strings included in the phrase-level token as committed character strings. For instance, in the present example, gesture module 8 may select the character strings "this is a" as committed character strings. In response, gesture module 8 may remove the one or more committed character strings from the plurality of character strings included in the phrase-level token, and may output the one or more committed character strings for display at committed-text region 14 of GUI 12. In addition, gesture module 8 may output the phrase-level token from which the committed character strings have been removed for display at one or more of text-suggestion regions 24.

For instance, in this example, prior to determining that a phrase-level token including the plurality of predicted character strings "this is a delightful keyboard" satisfies the threshold, gesture module 8 may output the predicted phrase "this is a delightful keyboard" for display at one or more of text-suggestion regions 24. In response to determining that the phrase-level token satisfies the threshold (e.g., determining that a number of word-level tokens included in the phrase-level token satisfies a threshold number, such as five word-level tokens), gesture module 8 may select one or more character strings as committed character strings, such as the character strings "this is a". In this example, gesture module 8 may remove the character strings "this is a" from the phrase-level token, thereby determining a modified phrase-level token that includes the character strings "delightful keyboard". Gesture module 8 may output the committed character strings "this is a" for display at committed-text region 14 of GUI 12. In addition, gesture module 8 may output the modified phrase-level token for display at one or more of text-suggestion regions 24, such that the character strings "this is a delightful keyboard" is no longer displayed at text-suggestion regions 24 and the character strings "delightful keyboard" is displayed at one or more of text-suggestion regions 24.

Gesture module 8 may determine whether UI module 6 has completed receiving the gesture path data. Where UI module 6 has completed receiving the gesture path data, gesture module 8 may output one or more candidate words and/or phrases for display at the presence-sensitive display. Where UI module 6 has not completed receiving the gesture path data, gesture module 8 may continue to incrementally process the gesture path data. In some examples, gesture module 8 may output one or more output predictions prior to UI module 6 completing reception of the gesture path data.

As such, according to techniques of this disclosure, gesture module 8 may determine one or more word-level tokens and one or more phrase-level tokens based on a received indication of a gesture to select one or more keys of a graphical keyboard, thereby enabling a user to enter a word or phrase by providing one continuous motion gesture. In addition, by incrementally determining multiple word-level and/or phrase level tokens and advancing the respective tokens as gesture module 8 receives the indication of the gesture to select the group of keys, gesture module 8 may incrementally update its determination of candidate words and/or phrases based on spatial and language models, thereby enabling a more accurate interpretation of the gesture. Moreover, by enabling the user to provide one continuous gesture to enter multi-word phrases, techniques of this disclosure may more effectively recognize ambiguous hyphenated or connected words. For instance, hyphenated or connected words such as "smoke-free" may be included in a lexicon as the single words "smoke" and "free", or as the hyphenated word "smoke-free". By enabling a user to provide a single continuous gesture to enter multi-word phrases, techniques described herein may enable the user to provide the single gesture to enter the words without regard to whether the word is hyphenated.

Figure 3A:
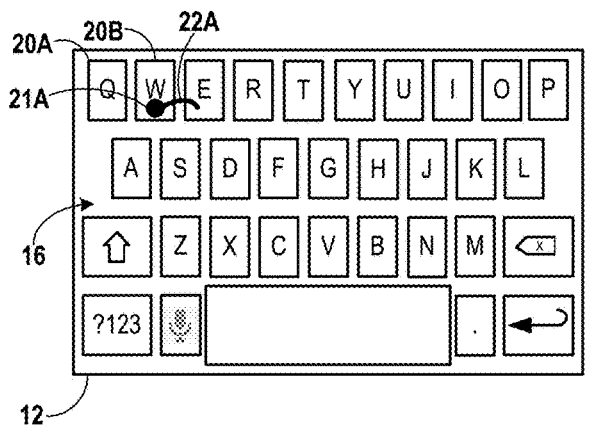
FIGS. 3A-C are block diagrams illustrating further details of one example of a computing device shown in FIG. 1, in accordance with one or more techniques of the present disclosure.
Figure 3A:
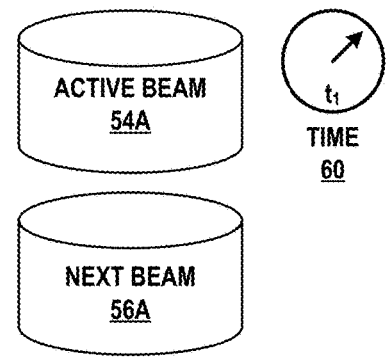
Figure 3B:
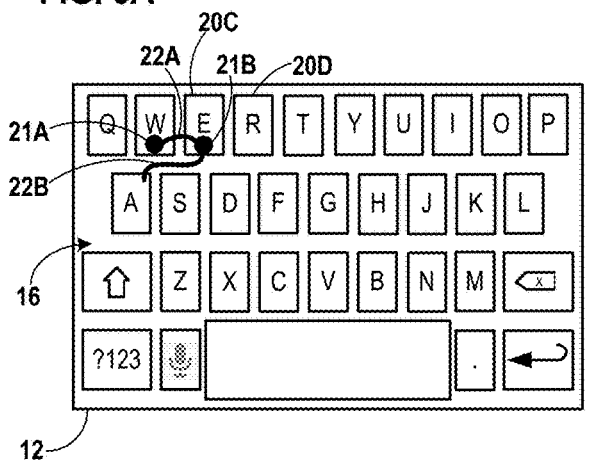
Figure 3B:
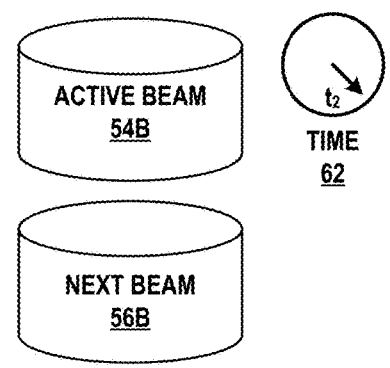
Figure 3C:
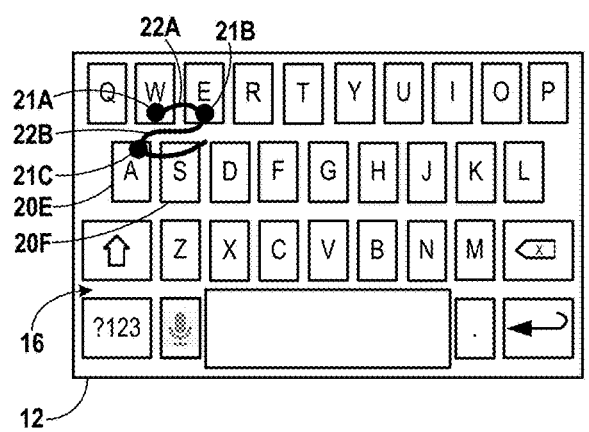
Figure 3C:
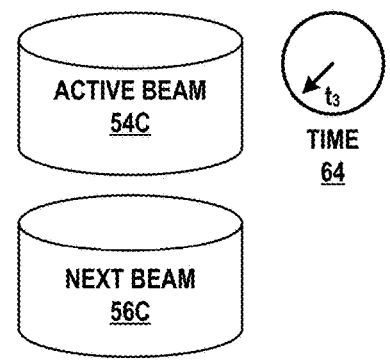

FIGS. 3A-C are block diagrams illustrating further details of one example of a computing device shown in FIG. 1, in accordance with one or more techniques of the present disclosure. As shown in the conceptual example of FIG. 3A, at time 60, computing device 2 may include GUI 12, active beam 54A, and next beam 56A. GUI 12 may include graphical keyboard 16 which may include "Q" key 20A and "W" key 20B. While shown in FIG. 3A, gesture path 22A and/or alignment point 21A may not be visible during the performance of the techniques described herein.

As shown in the example of FIG. 1, a user may desire to enter text into computing device 2 by performing a gesture at graphical keyboard 16. As previously discussed, while the user performs the gesture, computing device 2 may detect a gesture having a gesture path. In the example of FIG. 3A, computing device 2 is shown as having detected gesture path 22A.

In response to detecting gesture path 22A, computing device 2 may determine alignment point 21A along gesture path 22A. Additionally, in response to detecting gesture path 22A, computing device 2 may create a word-level token and push the word-level token into active beam 54A. At time 60, the contents on active beam 54A may be represented by Table 1 below.

TABLE 1

| Index | Parent Index | Letter Key of Current Node | Letter Chain | Cost Value |
|---|---|---|---|---|
| 0 | — | — | — | 0 |

In Table 1, each row represents an individual word-level token, the index column represents a unique identifier for each word-level token, the parent index column represents the index value of the word-level token to which the listed word-level token is a child, the letter key of the current node column represent the letter key represented by the current node of the word-level token, the letter chain column represents all of the letter keys represented by the nodes from the entry node to the current node of the word-level token, and the cost value column represent the cost value of the word-level token. As shown in Table 1, the created word-level token has an index of 0 (i.e., word-level token$_0$), no parent index, no letter key of the current node, no letter chain, and a cost value of zero.

To determine the text indicated by the gesture, computing device 2 may create a copy of each word-level token on its child nodes. In some examples, an entry node may have 26 child nodes (one for each letter of the English alphabet). For simplicity, in the example of FIG. 3A, the entry node has only two child nodes on the letters "W" and "Q". Therefore, computing device 2 may create a copy of the word-level token with index 0 on child node "W" (i.e., word-level token$_1$) and child node "Q" (i.e., word-level token). For each created word-level token copy, computing device 2 may determine a cost value as described above. Computing device 2 may push each word-level token copy to next beam 56A, the contents of which may be represented by Table 2 below.

TABLE 2

| Index | Parent Index | Letter Key of Current Node | Letter Chain | Cost Value |
|---|---|---|---|---|
| 1 | 0 | W | W | CV1 |
| 2 | 0 | Q | Q | CV2 |

The entries shown in Table 2 are similar in format to the entry shown in Table 1. In Table 2, word-level token$_1$ has cost value CV1 and word-level token$_2$ has cost value CV2. After creating the word-level token copies, computing device 2 may determine that word-level token$_0$ is not a terminal node, and may discard word-level token$_0$. Computing device 2 may subsequently determine whether active beam 54A is empty (i.e., contains no tokens). In response to determining that active beam 54A is empty, computing device 2 may copy the contents of next beam 56A to active beam 54B of FIG. 3B and discard the contents of next beam 56A.

In the example of FIG. 3B, computing device 2 is shown as having detected gesture path 22B at time 62. As described above, the contents of active beam 54B may be represented by Table 2. Computing device 2 may determine alignment point 21B along gesture path 22B. Computing device 2 may, for each word-level token in active beam 54B, create a copy on each child node. In the example of FIG. 3B, word-level token$_1$ and word-level token$_2$ each have child nodes with letter keys "E" and "R". For each created word-level token copy, computing device 2 may determine a cost value as described above. Computing device 2 may push each word-level token copy in to next beam 56B, the contents of which may be represented by Table 3 below.

TABLE 3

| Index | Parent Index | Letter Key of Current Node | Letter Chain | Cost Value |
|---|---|---|---|---|
| 3 | 1 | E | WE | CV1 + CV3 |
| 4 | 1 | R | WR | CV1 + CV4 |
| 5 | 2 | E | QE | CV2 + CV5 |
| 6 | 2 | R | QR | CV2 + CV6 |

The entries shown in Table 3 are similar in format to the entries shown in Table 1 and Table 2. In Table 3, the cost value for each word-level token includes the cost value for the previous letters and the cost value for the current letter. Computing device 2 may determine which, if any, of the word-level tokens are on terminal nodes. For instance, computing device 2 may determine that word-level token$_3$ is on a terminal node because its string of predicted characters (i.e., its letter chain) "WE" represents a candidate word included in the lexicon (e.g., the English language).

In response to determining that a word-level token is on a terminal node, computing device 2 may copy the word-level token to a list of output predictions. The list of output predictions may be represented by Table 4 below. In some examples, computing device 2 may copy only the letter chain of the token to the list of output predictions.

TABLE 4

| Index | Parent Index | Letter Key of Current Node | Letter Chain | Cost Value |
|---|---|---|---|---|
| 3 | 1 | 0 | NO | CV1 + CV3 |

In addition, computing device 2 may generate, in response to determining that the word-level token is on a terminal node, a next-word token that indicates that a next selected key of the plurality of keys is a prefix of a second word-level token. The next-word token may be considered an entry node of the second word-level token. Computing device 2 may push the next-word token (i.e., the entry node of the second word-level token) into active beam 54B, the contents of which may be represented by Table 5 below.

TABLE 5

| Index | Parent Index | Letter Key of Current Node | Letter Chain | Cost Value |
|---|---|---|---|---|
| 3 | 1 | E | WE | CV1 + CV3 |
| 4 | 1 | R | WR | CV1 + CV4 |
| 5 | 2 | E | QE | CV2 + CV5 |
| 6 | 2 | R | QR | CV2 + CV6 |
| 7 | 3 | — | — | 0 |

The entries shown in Table 5 are similar in format to the entries shown in Tables 1, 2, and 3. As shown in Table 5, the created word-level token corresponding to the next-word token has an index of 7 (i.e., word-level token$_7$), a parent index of 3 (i.e., corresponding to word-level token$_3$), no letter key of the current node, no letter chain, and a cost value of zero. In certain examples, the combination of word-level token$_3$ and word-level token$_7$ may be considered a phrase-level token that includes a plurality of character strings.

In the example of FIG. 3C, computing device 2 is shown as having detected gesture path 22B at time 74. As described above, the contents of active beam 54C may be represented by Table 5. Computing device 2 may determine alignment point 21C along gesture path 22B. Computing device 2 may, for each word-level token in active beam 54C, create a copy on each child node. In the example of FIG. 3C, token$_3$ through token$_6$ each have child nodes with letter keys "E" and "R". In addition, token$_7$ may be considered an entry node for a second word-level token of a phrase-level token including token$_3$. As such, computing device 2 may create a copy at a child node of word-level token$_7$ included in the phrase-level token. For each created word-level token copy and each phrase-level token, computing device 2 may determine a cost value as described above. Computing device 2 may push each word-level token copy and each phrase-level token copy into next beam 56C, the contents of which may be represented by Table 6 below.

TABLE 6

| Index | Parent Index | Letter Key of Current Node | Letter Chain | Cost Value |
|---|---|---|---|---|
| 8 | 3 | A | WEA | CV1 + CV3 + CV7 |
| 9 | 3 | S | WES | CV1 + CV3 + CV8 |
| 10 | 4 | A | WRA | CV1 + CV4 + CV9 |
| 11 | 4 | S | WRS | CV1 + CV4 + CV10 |
| 12 | 5 | A | QEA | CV2 + CV5 + CV11 |
| 13 | 5 | S | QES | CV2 + CV5 + CV12 |
| 14 | 6 | A | QRA | CV2 + CV6 + CV13 |
| 15 | 6 | S | QRS | CV2 + CV6 + CV14 |
| 16 | 7 | A | A | CV15 |
| 17 | 7 | S | S | CV16 |
| 18 | 16 | A | WE A | CV1 + CV3 + CV15 |
| 19 | 17 | S | WE S | CV1 + CV3 + CV16 |

The entries shown in Table 6 are similar in format to the entries shown in Tables 1-3. In Table 6, the cost value for each word-level token includes the cost value for the previous letters and the cost value for the current letter. In addition, the cost value for each phrase-level token (i.e., phrase-level token's and phrase-level token$_{19}$) includes the cost value for the previous letters of the each previous word-level token, the cost value for each previous letter in the current word-level token, and the cost value for the current letter of the current word-level token. As such, computing device 2 may determine one or more phrase-level tokens based at least in part on a word-level token that represents a candidate word included in the lexicon and a predicted selection of a character key. In such a way, computing device 2 may determine both word-level tokens and phrase-level tokens in response to receiving an indication of a gesture to select a group of keys included in a graphical keyboard. Computing device 2 may continue to incrementally determine the one or more word-level tokens and one or more phrase-level tokens as computing device 2 receives further indications of the gesture, thereby enabling a user to provide a single gesture to select a group of keys of a word or phrase.

In the example of FIG. 3C, computing device 2 may determine whether the user has completed performing the gesture. In response to determining that the user has completed performing the gesture, computing device 2 may output a list of output predictions. The output predictions may include one or more candidate words based at least in part on the one or more word-level tokens, one or more candidate phrases based at least in part on the one or more phrase-level tokens, or both. In some examples, computing device 2 may determine a subset of the list of output predictions which have the highest cost values (i.e., the predictions with the highest probability). Additionally, in some examples, computing device 2 may, at each subsequent alignment point, revise the cost values of the tokens contained in the list of output predictions. For instance, computing device 2 may increase the cost value of token$_3$ (e.g., make token$_3$ less probable) in response to detecting gesture path 22B.

Figure 4A:
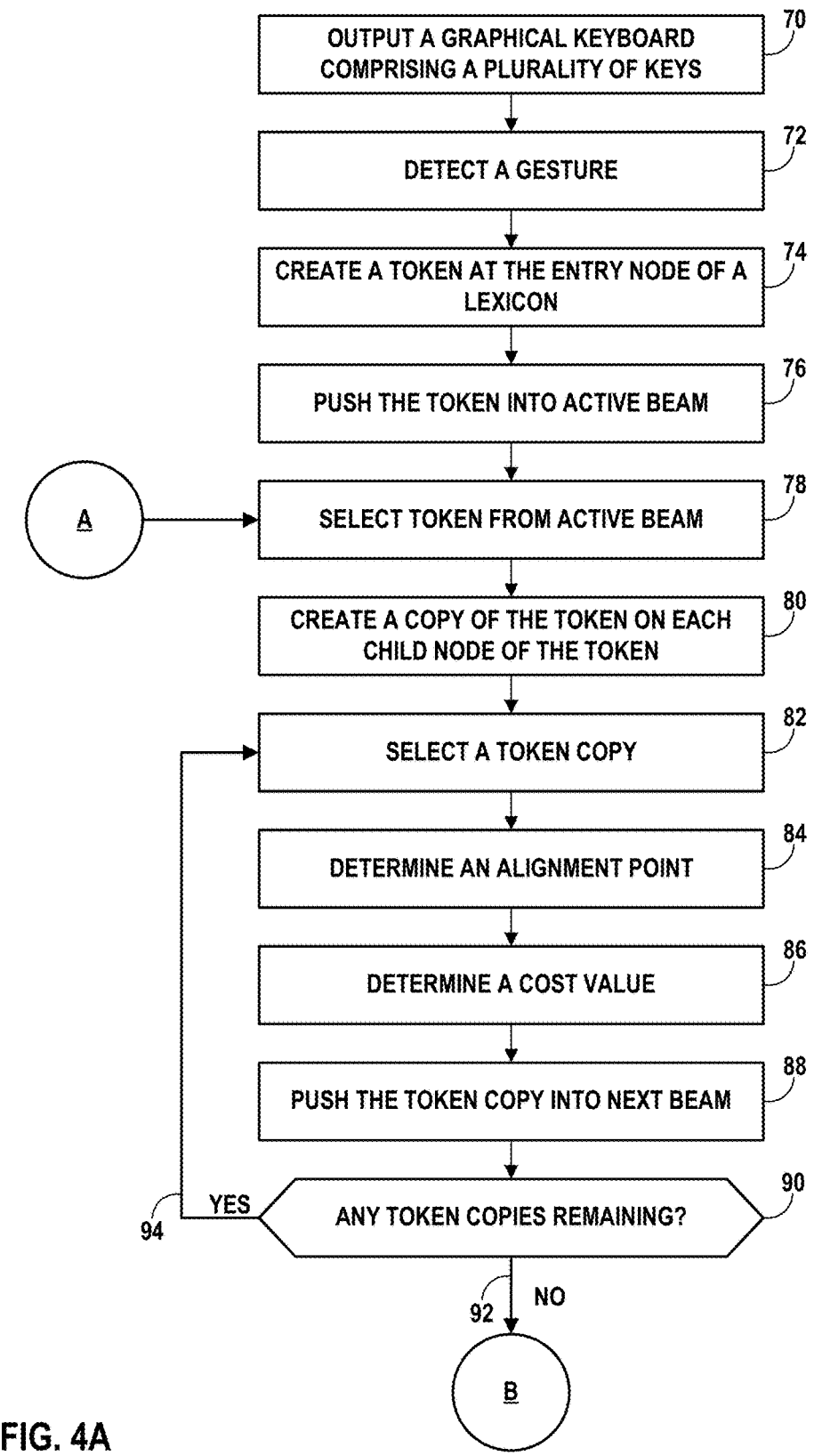
FIGS. 4A-B are flow diagrams illustrating example operations of a computing device to determine a candidate word and/or phrase from a gesture, in accordance with one or more techniques of the present disclosure.
Figure 4B:
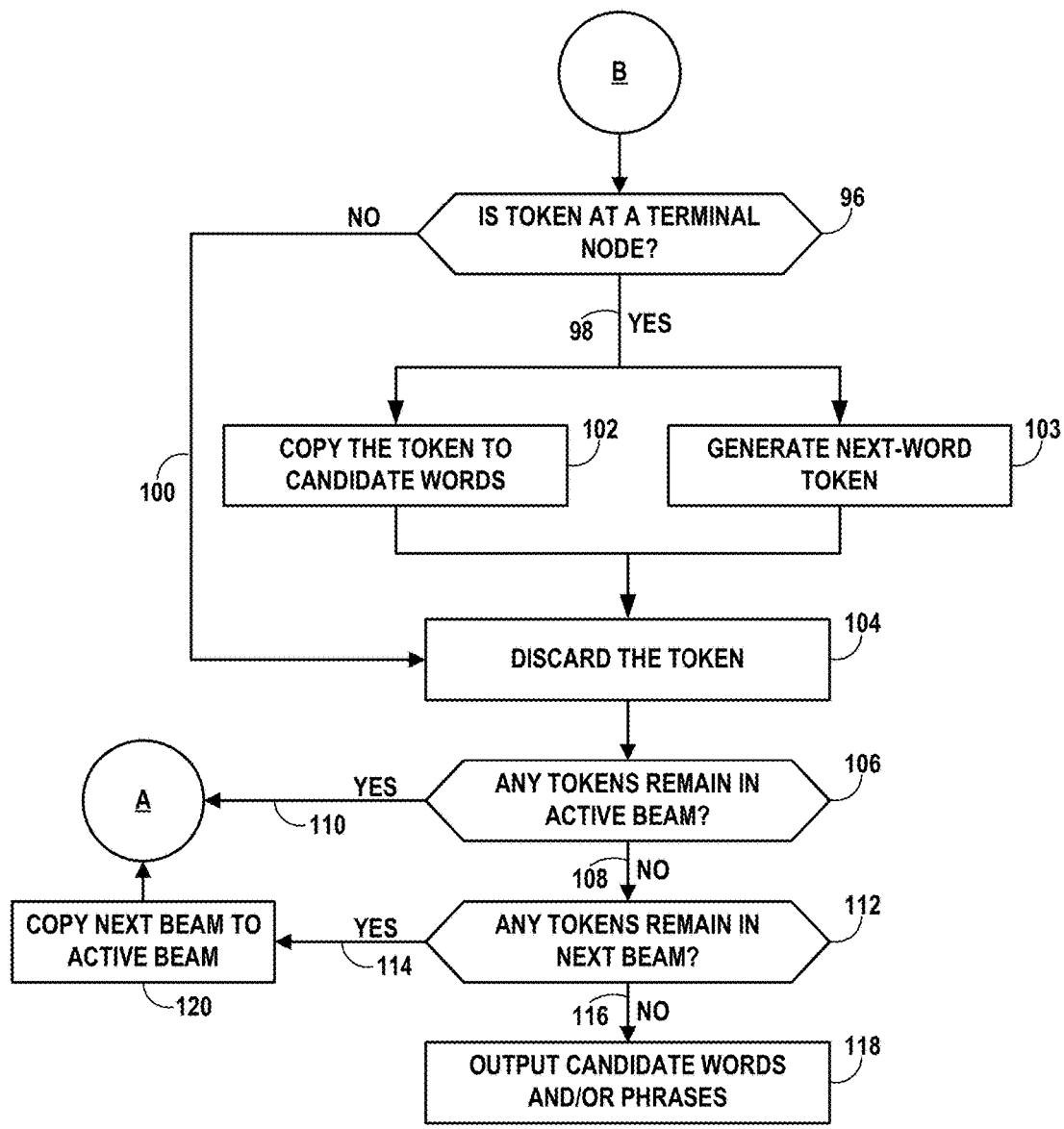

FIGS. 4A-B are flow diagrams illustrating example operations of a computing device to determine a candidate word and/or phrase from a gesture, in accordance with one or more techniques of the present disclosure. For purposes of illustration only, the example operations are described below within the context of computing device 2, as shown in FIGS. 1 and 2.

In the example of FIGS. 4A-B, computing device 2 may initially output a graphical keyboard (e.g., graphical keyboard 16) comprising a plurality of keys at a presence-sensitive display (e.g., UI device 4) of computing device 2 (70). Computing device 2 may detect a gesture at the presence-sensitive display (72). For example, UI device 4 may detect a gesture having gesture path 22. UI module 6, executing on one or more processors 40, may receive an indication of the gesture detected at UI device 4. In response to receiving the indication of the gesture detected at the presence-sensitive display, computing device 2 may generate a word-level token having a cost value of zero at the entry node of a lexicon stored on computing device 2 as a lexicon trie (74). Computing device 2 may push the word-level token into an active beam (76). For instance, gesture module 8, executing on one or more processors 40, may push the word-level token into active beam 54.

Computing device 2 may select a word-level token from the active beam (78).

Computing device 2 may create a copy of the word-level token on each child node of the word-level token (80). Computing device 2 may select a word-level token copy (82) and determine an alignment point along the gesture (84). Computing device 2 may determine a cost value representing a probability that the alignment point indicates the letter key of the node on which the word-level token copy is positioned and add the cost value to the word-level token copy (86). Computing device 2 may push the word-level token copy into a next beam (88). Computing device 2 may determine whether there are any word-level token copies remaining (90). If there are word-level token copies remaining (94), computing device 2 may select a new word-level token copy (82).

If there are not any word-level token copies remaining (92), computing device 2 may determine whether the word-level token is at a terminal node of the lexicon trie (96). For instance, gesture module 8 may use language model 10 to determine whether the word-level token represents a candidate word included in a lexicon (e.g., the English language). If the word-level token is at a terminal node (98), computing device 2 may copy the word represented by the word-level token to a list of candidate words (102), and may generate a next-word token that indicates that a next selected key of the plurality of keys of the graphical keyboard is a prefix of a second word-level token (103). After copying the word to the list of candidate words and generating the next-word token, or if the word-level token is not at a terminal node (100), computing device 2 may discard the word-level token (104).

Computing device 2 may determine whether any word-level tokens remain in the active beam (106). If there are word-level tokens remaining in the active beam (110), computing device 2 may select a new word-level token from the active beam (78). If there are no word-level tokens remaining in the active beam (108), computing device 2 may determine whether any word-level tokens remain in the next beam (112). If there are word-level tokens remaining in the next beam (114), computing device 2 may copy the next beam to the active beam (120) and select a new word-level token from the active beam (78). If there are no word-level tokens remaining in the next beam (116), computing device 2 may output the list of candidate words at the presence-sensitive display (118).

Figure 5:
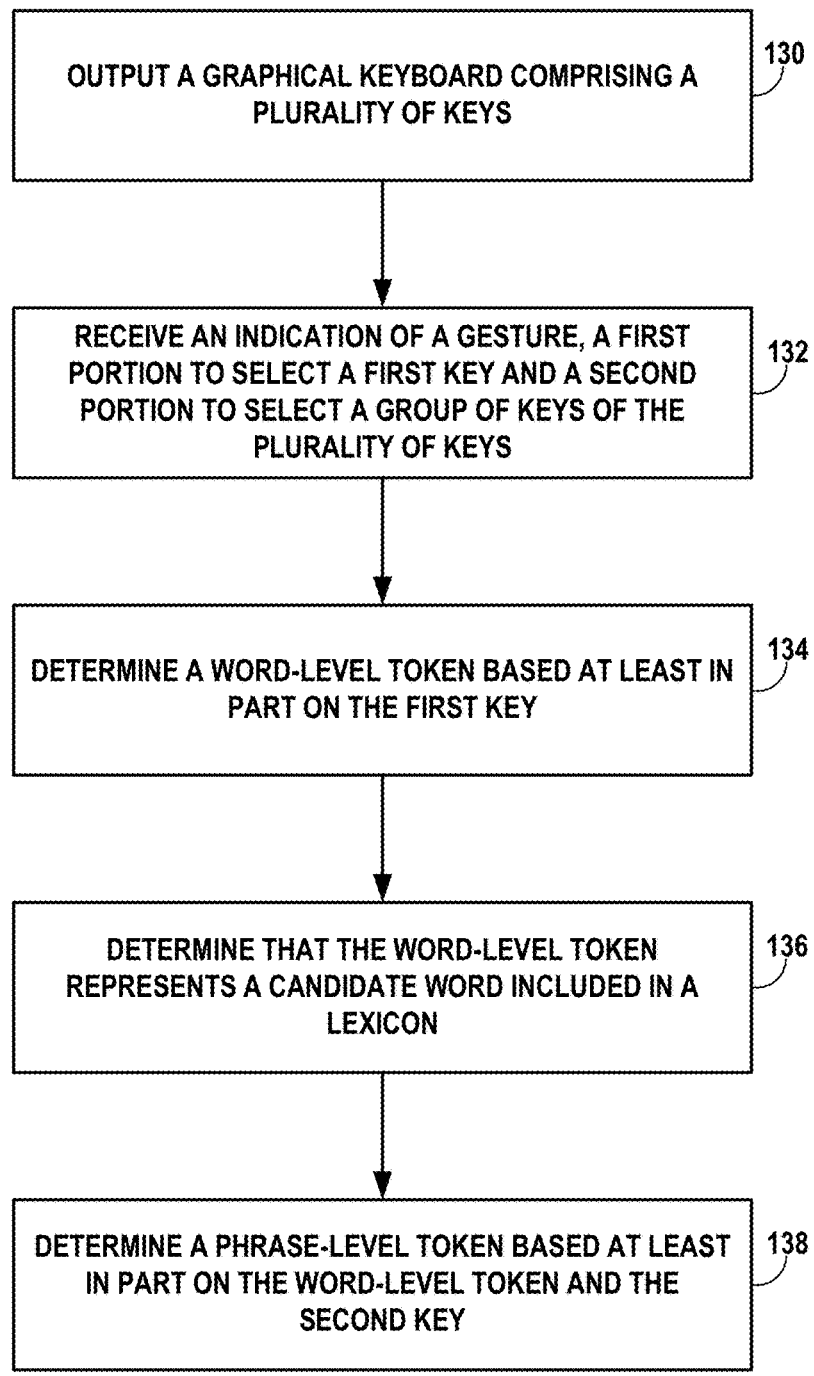
FIG. 5 is a flow diagram illustrating example operations of a computing device to determine a candidate word and/or phrase from a gesture, in accordance with one or more techniques of the present disclosure.

FIG. 5 is a flow diagram illustrating example operations of a computing device to determine a candidate word and/or phrase from a gesture, in accordance with one or more techniques of the present disclosure. For purposes of illustration only, the example operations are described below within the context of computing device 2, as shown in FIGS. 1 and 2.

In the example of FIG. 5, computing device 2 may output, for display at a presence-sensitive display operatively coupled to the computing device, a graphical keyboard comprising a plurality of keys (130). For example UI module 6, executing on one or more processors 40, may output graphical keyboard 16 for display at output device 46. Computing device 2 may receive an indication of a gesture detected at the presence-sensitive display, a first portion of the gesture to select a first key of the plurality of keys and a second portion of the gesture to select a second key of the plurality of keys (132). For instance, UI module 6 may receive an indication of a gesture detected at input device 42, the gesture including portion 22A of gesture path 22 to select "E" key 20C and portion 22B of gesture path 22 to select "A" key 20E.

Computing device 2 may determine, based at least in part on the first key, a word-level token comprising a single string of a plurality of predicted characters (134). As an example, gesture module 8, executing on one or more processors 40, may determine a word-level token including the single string "we" based at least in part on "E" key 20C. Computing device 2 may determine that the word-level token represents a candidate word included in a lexicon (136). For instance, gesture module 8 may determine that the word-level token including the single string "we" represents the candidate word "we" included in a lexicon (e.g., the English language) of language model 10.

Computing device 2 may determine, in response to determining that the word-level token represents the candidate word in the lexicon, a phrase-level token based at least in part on the word-level token and the second key (138). The phrase-level token may include a plurality of character strings. For example, gesture module 8 may determine a phrase-level token as the plurality of character strings "we" and "a", based at least in part on the word-level token "we" and "A" key 20E.

In one example, the operations include determining, by computing device 2 and in response to determining the phrase-level token, a candidate phrase based at least in part on the phrase-level token; and outputting, by computing device 2, the candidate phrase for display at the presence-sensitive display. In one example, the plurality of character strings of the phrase-level token comprises a first character string and a second character string, wherein the word-level token comprises the first character string, and wherein the second character string comprises a character associated with the second key. In one example, the second character string begins with the character associated with the second key.

In one example, the word-level token comprises a first word-level token comprising a first single string of the plurality of predicted characters, the operations further comprising determining, by the computing device and based at least in part on the first key and the second key, a second word-level token comprising a second single string of the plurality of predicted characters. In one example, the word-level token is a first word-level token comprising a first single string of the plurality of predicted characters, and determining the phrase-level token comprises: generating, in response to determining that the first word-level token represents the candidate word in the lexicon, a next-word token that indicates that a next selected key of the plurality of keys is a prefix of a second word-level token; determining, in response to determining the next-word token, a second word-level token comprising a second single string of the plurality of predicted characters, wherein the second key is a prefix of the second word-level token; and determining the phrase-level token as a combination of the first word-level token and the second word-level token.

In one example, determining the phrase-level token further includes: determining, based on a plurality of features associated with the gesture, a group of alignment points traversed by the gesture; determining respective cost values for each of at least the first key, the second key, and a third key, wherein each of the respective cost values represents a probability that an alignment point of the group of alignment points indicates a key of the plurality of keys; determining a first combined cost value based at least in part on the determined cost value for the first key and the determined cost value for the second key; determining a second combined cost value based at least in part on the determined cost value for the first key and the determined cost value for the third key; comparing the first combined cost value and the second combined cost value; and determining the second word-level token based on the comparison of the first combined cost value and the second combined cost value.

In one example, the plurality of features associated with the gesture comprises at least one of: a length of a segment of the gesture, wherein the segment comprises a path traversed by the gesture at the presence-sensitive display; a direction of the segment of the gesture; a curvature of the segment of the gesture; a local speed that represents a rate at which the segment of the gesture was detected; and a global speed that represents a rate at which the gesture was detected. In one example, determining the respective cost values for each of at least the first key, the second key, and the third key comprises: determining respective physical cost values for each of at least the first key, the second key, and the third key, wherein each of the respective physical cost values represents a probability that at least one physical feature of an alignment point of the group of alignment points indicates at least one physical feature of a key of the plurality of keys; determining respective lexical cost values for each of at least the first key, the second key, and the third key, wherein each of the respective lexical cost values represents a probability that a letter represented by a key of the plurality of keys is included in a candidate word; and determining the respective cost values for each of at least the first key, the second key, and the third key based on the respective physical cost values and the respective lexical cost values for each of at least the first key, the second key, and the third key.

In one example, determining the respective physical cost values for each of at least the first key, the second key, and the third key comprises comparing key regions of each of at least the first key, the second key, and the third key with at least one of the plurality of features associated with the gesture, wherein the key regions comprise locations of the presence-sensitive display that output the respective keys. In one example, determining the respective lexical cost values for each of at least the first key, the second key, and the third key comprises comparing each of at least the first key, the second key, and the third key with a language model. In one example, the language model comprises an n-gram language model. In one example, language model comprises a group of predefined phrases.

In one example, the phrase-level token is a first phrase-level token comprising a first plurality of character strings, and the operations further include: determining, by computing device 2, that the first phrase-level token satisfies a threshold; responsive to determining that the first phrase-level token satisfies the threshold, selecting, by computing device 2, a character string of the first plurality of character strings of the first phrase-level token as a committed character string; and removing, by computing device 2, the committed character string from the first plurality of character strings of the phrase-level token to determine a second phrase-level token comprising a second plurality of character strings.

In one example, the operations further include: outputting, by computing device 2, the first phrase-level token for display at a text-suggestion region of the presence-sensitive display; and responsive to determining that the first phrase-level token satisfies the threshold: outputting, by computing device 2, the committed character string for display at a committed-text region of the presence-sensitive display, wherein the committed-text region is different than the text-suggestion region; and outputting, by computing device 2, the second plurality of character strings for display at the text-suggestion region. In one example, determining that the first phrase-level token satisfies the threshold comprises determining that a number of character strings of the first plurality of character strings satisfies a threshold number of character strings. In one example, receiving the indication of the gesture comprises receiving an indication of a motion of an input unit from a first location of the presence-sensitive display to a second location of the presence-sensitive display with substantially constant contact between the input unit and the presence-sensitive display. In one example, the lexicon is implemented, by computing device 2, as a trie data structure.

Figure 6:
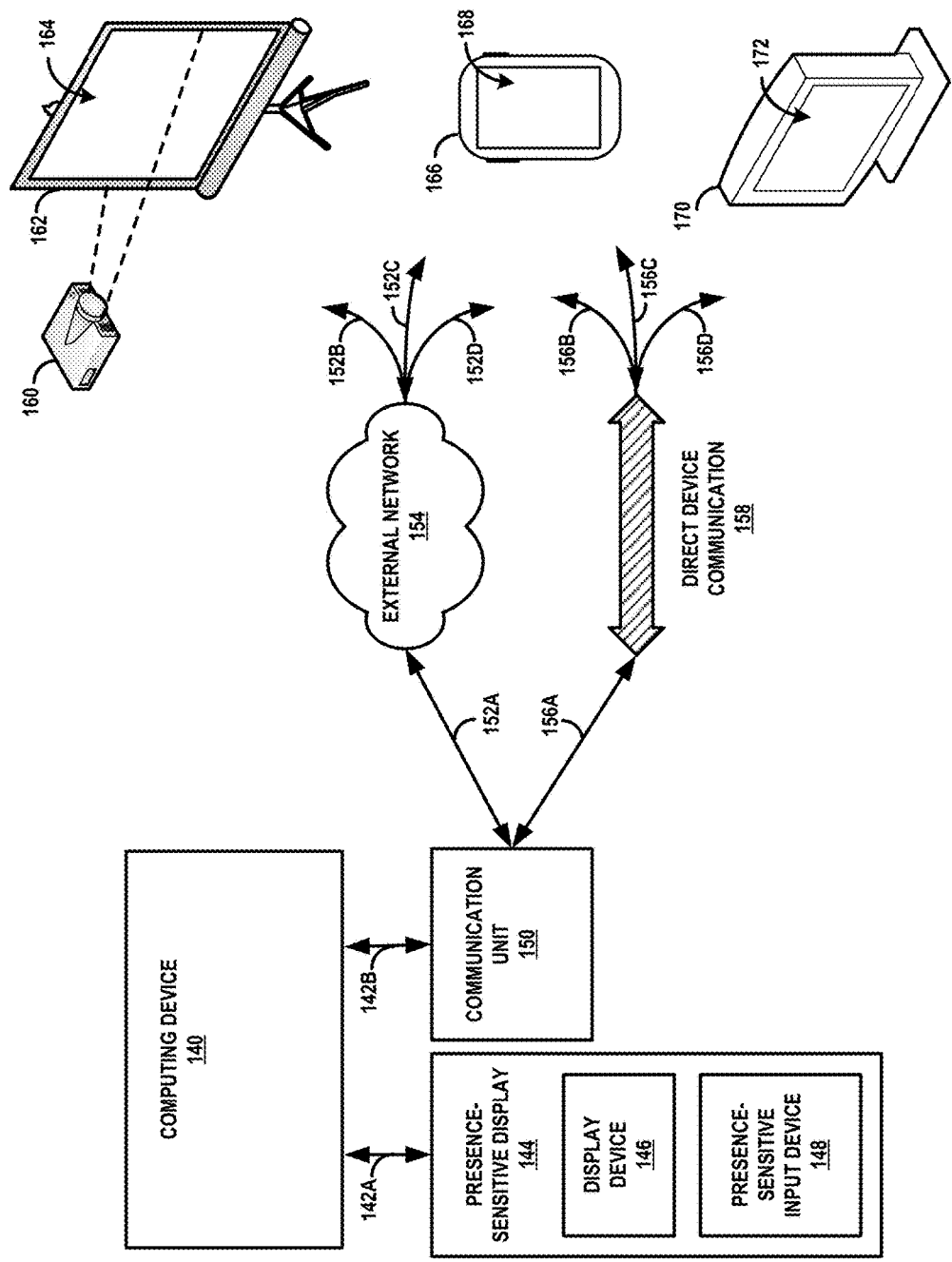
FIG. 6 is a block diagram illustrating an example computing device that outputs graphical content for display at a remote device, in accordance with one or more techniques of the present disclosure.

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 140, presence-sensitive display 144, communication unit 150, projector 160, projector screen 162, tablet device 166, and visual display device 170. Although shown for purposes of example in FIGS. 1 and 2 as a stand-alone computing device, a computing device may, generally, be any component or system that includes a processor or other suitable computing environment for executing software instructions and, for example, need not include a presence-sensitive display.

As shown in the example of FIG. 6, computing device 140 may be a processor that includes functionality as described with respect to processor 40 in FIG. 2. In such examples, computing device 140 may be operatively coupled to presence-sensitive display 144 by a communication channel 142A, which may be a system bus or other suitable connection. Computing device 140 may also be operatively coupled to communication unit 150, further described below, by a communication channel 142B, which may also be a system bus or other suitable connection. Although shown separately as an example in FIG. 6, computing device 140 may be operatively coupled to presence-sensitive display 144 and communication unit 150 by any number of one or more communication channels.

In other examples, such as illustrated previously in FIGS. 1-2, computing device 140 may be a portable or mobile device such as mobile phones (including smart phones), laptop computers, etc. In some examples, computing device 140 may be a desktop computers, tablet computers, smart television platforms, cameras, personal digital assistants (PDAs), servers, mainframes, etc.

Presence-sensitive display 144, as shown in FIG. 6, may include display device 146 and presence-sensitive input device 148. Display device 146 may, for example, receive data from computing device 140 and display the graphical content. In some examples, presence-sensitive input device 148 may determine one or more user inputs (e.g., continuous gestures, multi-touch gestures, single-touch gestures, etc.) at presence-sensitive display 144 using capacitive, inductive, and/or optical recognition techniques and send indications of such user input to computing device 140 using communication channel 142A. In some examples, presence-sensitive input device 148 may be physically positioned on top of display device 146 such that, when a user positions an input unit over a graphical element displayed by display device 146, the location at which presence-sensitive input device 148 corresponds to the location of display device 146 at which the graphical element is displayed.

As shown in FIG. 6, computing device 140 may also include and/or be operatively coupled with communication unit 150. Communication unit 150 may include functionality of communication unit 44 as described in FIG. 2. Examples of communication unit 150 may include a network interface card, an Ethernet card, an optical transceiver, a radio frequency transceiver, or any other type of device that can send and receive information. Other examples of such communication units may include Bluetooth, 3G and WiFi radios, Universal Serial Bus (USB) interfaces, etc. Computing device 140 may also include and/or be operatively coupled with one or more other devices, e.g., input devices, output devices, memory, storage devices, etc. that are not shown in FIG. 6 for purposes of brevity and illustration.

FIG. 6 also illustrates a projector 160 and projector screen 162. Other such examples of projection devices may include electronic whiteboards, holographic display devices, and any other suitable devices for displaying graphical content. Projector 160 and project screen 162 may include one or more communication units that enable the respective devices to communicate with computing device 140. In some examples, the one or more communication units may enable communication between projector 160 and projector screen 162. Projector 160 may receive data from computing device 140 that includes graphical content. Projector 160, in response to receiving the data, may project the graphical content onto projector screen 162. In some examples, projector 160 may determine one or more user inputs (e.g., continuous gestures, multi-touch gestures, single-touch gestures, etc.) at projector screen using optical recognition or other suitable techniques and send indications of such user input using one or more communication units to computing device 140.

Projector screen 162, in some examples, may include a presence-sensitive display 164. Presence-sensitive display 164 may include a subset of functionality or all of the functionality of UI device 4 as described in this disclosure. In some examples, presence-sensitive display 164 may include additional functionality. Projector screen 162 (e.g., an electronic whiteboard), may receive data from computing device 140 and display the graphical content. In some examples, presence-sensitive display 164 may determine one or more user inputs (e.g., continuous gestures, multi-touch gestures, single-touch gestures, etc.) at projector screen 162 using capacitive, inductive, and/or optical recognition techniques and send indications of such user input using one or more communication units to computing device 140.

FIG. 6 also illustrates tablet device 166 and visual display device 170. Tablet device 166 and visual display device 170 may each include computing and connectivity capabilities. Examples of tablet device 166 may include e-reader devices, convertible notebook devices, hybrid slate devices, etc.

Examples of visual display device 170 may include televisions, computer monitors, etc. As shown in FIG. 6, tablet device 166 may include a presence-sensitive display 168. Visual display device 170 may include a presence-sensitive display 172. Presence-sensitive displays 168, 172 may include a subset of functionality or all of the functionality of UI device 4 as described in this disclosure. In some examples, presence-sensitive displays 168, 172 may include additional functionality. In any case, presence-sensitive display 172, for example, may receive data from computing device 140 and display the graphical content. In some examples, presence-sensitive display 172 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 140.

As described above, in some examples, computing device 140 may output graphical content for display at presence-sensitive display 144 that is coupled to computing device 140 by a system bus or other suitable communication channel. Computing device 140 may also output graphical content for display at one or more remote devices, such as projector 160, projector screen 162, tablet device 166, and visual display device 170. For instance, computing device 140 may execute one or more instructions to generate and/or modify graphical content in accordance with techniques of the present disclosure. Computing device 140 may output the data that includes the graphical content to a communication unit of computing device 140, such as communication unit 150. Communication unit 150 may send the data to one or more of the remote devices, such as projector 160, projector screen 162, tablet device 166, and/or visual display device 170. In this way, computing device 140 may output the graphical content for display at one or more of the remote devices. In some examples, one or more of the remote devices may output the graphical content at a presence-sensitive display that is included in and/or operatively coupled to the respective remote devices.

In some examples, computing device 140 may not output graphical content at presence-sensitive display 144 that is operatively coupled to computing device 140. In other examples, computing device 140 may output graphical content for display at both a presence-sensitive display 144 that is coupled to computing device 140 by communication channel 142A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 140 and output for display at presence-sensitive display 144 may be different than graphical content display output for display at one or more remote devices.

Computing device 140 may send and receive data using any suitable communication techniques. For example, computing device 140 may be operatively coupled to external network 154 using network link 152A. Each of the remote devices illustrated in FIG. 6 may be operatively coupled to network external network 154 by one of respective network links 152B, 152C, and 152D. External network 154 may include network hubs, network switches, network routers, etc., that are operatively inter-coupled thereby providing for the exchange of information between computing device 140 and the remote devices illustrated in FIG. 6. In some examples, network links 152A-152D may be Ethernet, ATM or other network connections. Such connections may be wireless and/or wired connections.

In some examples, computing device 140 may be operatively coupled to one or more of the remote devices included in FIG. 6 using direct device communication 158. Direct device communication 158 may include communications through which computing device 140 sends and receives data directly with a remote device, using wired or wireless communication. That is, in some examples of direct device communication 158, data sent by computing device 140 may not be forwarded by one or more additional devices before being received at the remote device, and vice-versa. Examples of direct device communication 158 may include Bluetooth, Near-Field Communication, Universal Serial Bus, WiFi, infrared, etc. One or more of the remote devices illustrated in FIG. 6 may be operatively coupled with computing device 140 by communication links 156A-156D. In some examples, communication links 152A-152D may be connections using Bluetooth, Near-Field Communication, Universal Serial Bus, infrared, etc. Such connections may be wireless and/or wired connections.

In accordance with techniques of the disclosure, computing device 140 may be operatively coupled to visual display device 170 using external network 154. Computing device 140 may output a graphical keyboard for display at presence-sensitive display 172. For instance, computing device 140 may send data that includes a representation of the graphical keyboard to communication unit 150. Communication unit 150 may send the data that includes the representation of the graphical keyboard to visual display device 170 using external network 154. Visual display device 170, in response to receiving the data using external network 154, may cause presence-sensitive display 172 to output the graphical keyboard. In response to a user performing a first portion of a gesture at presence-sensitive display 172 to select a first key of the keyboard, visual display device 170 may send an indication of the gesture to computing device 140 using external network 154. Communication unit 150 may receive the indication of the gesture, and send the indication to computing device 140. Similarly, in response to a user performing a second portion of the gesture at presence-sensitive display 172 to select a second key of the keyboard, visual display device 170 may send an indication of the gesture to computing device 140 using external network 154.

Computing device 140 may determine, based at least in part on the first key, a word-level token including a single string of a plurality of predicted characters. In some examples, computing device 140 may determine that the word-level token represents a candidate work included in a lexicon. In response to determining that the word-level token represents the candidate work in the lexicon, computing device 140 may determine a phrase-level token based at least in part on the word-level token and the second key. The phrase-level token may include a plurality of character strings. In certain examples, computing device 140 may determine a candidate phrase based at least in part on the phrase-level token. Computing device 140, in some examples, may send data that includes the candidate phrase to communication unit 150, which in turn sends the data to visual display device 170 using external network 154. Upon receiving the data, visual display device 170 may cause presence-sensitive display 172 to display the candidate phrase. In this way, computing device 140 may output the candidate phrase for display at presence-sensitive screen 172, in accordance with techniques of the disclosure.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   outputting, by a computing device, for display at a display device, a graphical user interface including a committed-text region, a text-suggestion region, and a graphical keyboard comprising a plurality of keys;
   determining, by the computing device, a first single-touch gesture detected at a first region of a presence-sensitive input device that corresponds to a first location of the display device at which a first key of the plurality of keys is displayed and a second single-touch gesture detected at a second region of the presence-sensitive input device that corresponds to a second location of the display device at which a second key of the plurality of keys is displayed, wherein a first character is associated with the first key and a second character is associated with the second key;
   determining, by the computing device, based on the first single-touch gesture and the second single-touch gesture, a first candidate word of a candidate phrase and a second candidate word of the candidate phrase, wherein the first candidate word comprises the first character and the second candidate word comprises the second character;
   outputting, by the computing device, for display in the committed-text region of the graphical user interface, the first candidate word and the second candidate word; and
   outputting, by the computing device and for display in the text-suggestion region of the graphical user interface, at least one next word that is subsequent to the first candidate word and the second candidate word in the candidate phrase.

2. The method of claim 1, further comprising:
   prior to outputting the first candidate word and the second candidate word for display in the committed-text region of the graphical user interface, outputting, for display in the text-suggestion region, the first candidate word, the second candidate word, and the at least one next word,
   wherein outputting the at least one next word for display in the text-suggestion region comprises outputting the at least one next word for display in the text-suggestion region such that the first candidate word and the second candidate word are no longer output for display in the text-suggestion region.

3. The method of claim 2, further comprising:
   outputting the at least one next word is output for display in the text-suggestion region such that the first candidate word and the second candidate word are no longer output for display in the text-suggestion region is in response to determining that a phrase-level token associated with the first single-touch gesture and the second single-touch gesture no longer includes a character string associated with the first candidate word and the second candidate word.

4. The method of claim 1, further comprising:
   selecting, by the computing device and based at least in part on the first single-touch gesture and the second single touch gesture, the first key and the second key of the plurality of keys;
   determining, by the computing device and based at least in part on the first key, a word-level token comprising a single string of a plurality of predicted characters;
   determining, by the computing device, that the word-level token represents the first candidate word; and
   responsive to determining that the word-level token represents the first candidate word, determining, by the computing device, a phrase-level token based at least in part on the word-level token and the second key, wherein the phrase-level token comprises a plurality of character strings including the first candidate word, the second candidate word, and the at least one next word.

5. The method of claim 4, further comprising:
   determining, by the computing device, the candidate phrase based at least in part on the phrase-level token.

6. The method of claim 1, wherein at least one of:
   the committed-text region is positioned, within the graphical user interface, above the graphical keyboard; or the suggested-text region is positioned, within the graphical user interface, above the graphical keyboard.

7. The method of claim 1, wherein the suggested-text region is positioned, within the graphical user interface, between the committed-text region and the graphical keyboard.

8. The method of claim 1, wherein:
the first single-touch gesture is one of a first plurality of single-touch gestures detected at the presence-sensitive input device;
the second single-touch gesture is one of a second plurality of single-touch gestures detected at the presence-sensitive input device;
the first candidate word is further determined based at least in part on the first plurality of single-touch gestures; and
the second candidate word is further determined based at least in part on the second plurality of single-touch gestures.

9. A computing device comprising:
at least one processor;
a presence-sensitive display; and
a memory configured to store instructions that, when executed, cause the at least one processor to:
output, for display at the presence-sensitive display, a graphical user interface including a committed-text region, a text-suggestion region, and a graphical keyboard comprising a plurality of keys;
determine a first single-touch gesture detected at a first region of the presence-sensitive display at which a first key of the plurality of keys is displayed and a second single-touch gesture detected at a second region of the presence-sensitive display at which a second key of the plurality of keys is displayed, wherein a first character is associated with the first key and a second character is associated with the second key;
determine, based on the first single-touch gesture and the second single-touch gesture, a first candidate word of a candidate phrase and a second candidate word of the candidate phrase, wherein the first candidate word comprises the first character and the second candidate word comprises the second character;
output, for display in the committed-text region of the graphical user interface, the first candidate word and the second candidate word; and
output, for display in the text-suggestion region of the graphical user interface, at least one next word that is subsequent to the first candidate word and the second candidate word in the candidate phrase.

10. The computing device of claim 9,
wherein the instructions, when executed, further cause the at least one processor to, prior to outputting the first candidate word and the second candidate word for display in the committed-text region of the graphical user interface, output, for display in the text-suggestion region, the first candidate word, the second candidate word, and the at least one next word, and
wherein the instructions, when executed, further cause the at least one processor to output the at least one next word for display in the text-suggestion region by at least outputting the at least one next word for display in the text-suggestion region such that the first candidate word and the second candidate word are no longer output for display in the text-suggestion region.

11. The computing device of claim 10, wherein the instructions, when executed, cause the at least one processor to output the at least one next word for display in the text-suggestion region such that the first candidate word and the second candidate word are no longer output for display in the text-suggestion region in response to determining that a phrase-level token associated with the first single-touch gesture and the second single-touch gesture no longer includes a character string associated with the first candidate word and the second candidate word.

12. The computing device of claim 9, wherein the instructions, when executed, further cause the at least one processor to:
select, based at least in part on the first single-touch gesture and the second single touch gesture, the first key and the second key of the plurality of keys;
determine, based at least in part on the first key, a word-level token comprising a single string of a plurality of predicted characters;
determine that the word-level token represents the first candidate word; and
in response to determining that the word-level token represents the first candidate word, determine a phrase-level token based at least in part on the word-level token and the second key, wherein the phrase-level token comprises a plurality of character strings including the first candidate word, the second candidate word, and the at least one next word.

13. The computing device of claim 9, wherein the instructions, when executed, further cause the at least one processor to determine the candidate phrase based at least in part on the phrase-level token.

14. The computing device of claim 9, wherein at least one of:
the committed-text region is positioned, within the graphical user interface, above the graphical keyboard;
the suggested-text region is positioned, within the graphical user interface, above the graphical keyboard; or
the suggested-text region is positioned, within the graphical user interface, between the committed-text region and the graphical keyboard.

15. A non-transitory computer-readable storage medium comprising instructions that, when executed, cause at least one processor of a computing device to:
output, for display at a presence-sensitive display of the computing device, a graphical user interface including a committed-text region, a text-suggestion region, and a graphical keyboard comprising a plurality of keys;
determine a first single-touch gesture detected at a first region of the presence-sensitive display at which a first key of the plurality of keys is displayed and a second single-touch gesture detected at a second region of the presence-sensitive display at which a second key of the plurality of keys is displayed, wherein a first character is associated with the first key and a second character is associated with the second key;
determine, based on the first single-touch gesture and the second single-touch gesture, a first candidate word of a candidate phrase and a second candidate word of the candidate phrase, wherein the first candidate word comprises the first character and the second candidate word comprises the second character;
output, for display in the committed-text region of the graphical user interface, the first candidate word and the second candidate word; and
output, for display in the text-suggestion region of the graphical user interface, at least one next word that is subsequent to the first candidate word and the second candidate word in the candidate phrase.

16. The non-transitory computer-readable storage medium of claim 15,
wherein the instructions, when executed, further cause the at least one processor to, prior to outputting the first candidate word and the second candidate word for display in the committed-text region of the graphical user interface, output, for display in the text-suggestion region, the first candidate word, the second candidate word, and the at least one next word, and
wherein the instructions, when executed, further cause the at least one processor to output the at least one next word for display in the text-suggestion region by at least outputting the at least one next word for display in the text-suggestion region such that the first candidate word and the second candidate word are no longer output for display in the text-suggestion region.

17. The non-transitory computer-readable storage medium of claim 16, wherein the instructions, when executed, cause the at least one processor to output the at least one next word for display in the text-suggestion region such that the first candidate word and the second candidate word are no longer output for display in the text-suggestion region in response to determining that a phrase-level token associated with the first single-touch gesture and the second single-touch gesture no longer includes a character string associated with the first candidate word and the second candidate word.

18. The non-transitory computer-readable storage medium of claim 15, wherein the instructions, when executed, further cause the at least one processor to:

select, based at least in part on the first single-touch gesture and the second single touch gesture, the first key and the second key of the plurality of keys;
determine, based at least in part on the first key, a word-level token comprising a single string of a plurality of predicted characters;
determine that the word-level token represents the first candidate word; and
in response to determining that the word-level token represents the first candidate word, determine a phrase-level token based at least in part on the word-level token and the second key, wherein the phrase-level token comprises a plurality of character strings including the first candidate word, the second candidate word, and the at least one next word.

19. The non-transitory computer-readable storage medium of claim 15, wherein the instructions, when executed, further cause the at least one processor to determine the candidate phrase based at least in part on the phrase-level token.

20. The non-transitory computer-readable storage medium of claim 15, wherein at least one of:
the committed-text region is positioned, within the graphical user interface, above the graphical keyboard;
the suggested-text region is positioned, within the graphical user interface, above the graphical keyboard; or
the suggested-text region is positioned, within the graphical user interface, between the committed-text region and the graphical keyboard.

* * * * *